(12) United States Patent
Ito

(10) Patent No.: US 11,960,196 B2
(45) Date of Patent: Apr. 16, 2024

(54) PROJECTOR

(71) Applicant: SEIKO EPSON CORPORATION, Tokyo (JP)

(72) Inventor: Yoshitaka Ito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/897,383

(22) Filed: Aug. 29, 2022

(65) Prior Publication Data

US 2023/0066382 A1 Mar. 2, 2023

(30) Foreign Application Priority Data

Aug. 30, 2021 (JP) ................. 2021-139785

(51) Int. Cl.
*G03B 21/20* (2006.01)

(52) U.S. Cl.
CPC ..... *G03B 21/2053* (2013.01); *G03B 21/2013* (2013.01)

(58) Field of Classification Search
USPC .......................................................... 353/85
See application file for complete search history.

(56) References Cited

U.S. PATENT DOCUMENTS

| 2007/0159605 A1 | 7/2007 | De Vaan |
| 2008/0088914 A1 | 4/2008 | Toyooka |
| 2015/0233054 A1 | 8/2015 | Gustavsson |

FOREIGN PATENT DOCUMENTS

| JP | 2004-144816 A | | 5/2004 |
| JP | 2004279817 A | * | 10/2004 |
| JP | 2007-518115 A | | 7/2007 |
| JP | 2008-089686 A | | 4/2008 |
| JP | 4731142 B2 | * | 7/2011 |
| JP | 2012-145765 A | | 8/2012 |
| JP | 2015-505914 A | | 2/2015 |
| JP | 6176439 B2 | | 8/2017 |

OTHER PUBLICATIONS

Translation of 2004279817 (Year: 2023).*
Translation of 4731142 (Year: 2023).*

* cited by examiner

*Primary Examiner* — Jerry L Brooks
(74) *Attorney, Agent, or Firm* — Oliff PLC

(57) ABSTRACT

A projector includes a first light source that emits a first light beam from a first light-emitting region including first light-emitting elements, and a second light source that emits a second light beam from a second light-emitting region including second light-emitting elements emitting light. Projector includes optical system that aligns traveling directions of first and second light beams, optical modulation device that adjusts first and second light beams based on image information, projection optical device, and control unit. The control unit changes a light-emitting position of the first light beam in the first light-emitting region to move an illumination region on an image forming region of the optical modulation device, and changes a light-emitting position of the second light beam in the second light-emitting region to move a second illumination region on the image forming region of the optical modulation device in the same direction as the first illumination region.

19 Claims, 10 Drawing Sheets

PROJECTOR

The present application is based on, and claims priority from JP Application Serial Number 2021-139785, filed Aug. 30, 2021, the disclosure of which is hereby incorporated by reference herein in its entirety.

BACKGROUND

1. Technical Field

The present disclosure relates to a projector.

2. Related Art

In related art, a projector is known that uses one liquid crystal panel as an optical modulation device for the purpose of reducing manufacturing costs (see JP-T-2007-518115, for example). In this projector, band-shaped blue, green, and red light beams are generated from white light emitted from a light source, and illumination is realized by causing those band-shaped light beams to continuously scan over the optical modulation device. Then, by displaying, on the optical modulation device, image data corresponding to the colors of the moving band-shaped light beams, a color image is displayed using the one optical modulation device.

However, in the projector having the above-described configuration, there is a problem in that the device configuration becomes large since a rotating prism is used to realize the continuous scanning illumination by the band-shaped light beams.

SUMMARY

In order to solve the problem described above, according to an aspect of the present disclosure, a projector is provided that includes a first light source including a first light-emitting region including a plurality of first light-emitting elements, the first light source being configured to emit a first light beam from the first light-emitting region, a second light source including a second light-emitting region including a plurality of second light-emitting elements emitting light having a wavelength different from a wavelength of the first light-emitting element, the second light source being configured to emit a second light beam from the second light-emitting region, an optical system configured to align traveling directions of the first light beam and the second light beam, an optical modulation device configured to modulate the first light beam and the second light beam incident from the optical system in accordance with image information, a projection optical device configured to project an image formed by the optical modulation device, and a control unit configured to control a light emission intensity of each of the plurality of first light-emitting elements of the first light source and a light emission intensity of each of the plurality of second light-emitting elements of the second light source. The control unit changes a light-emitting position of the first light beam in the first light-emitting region to move a first illumination region of the first light beam on an image forming region of the optical modulation device, and changes a light-emitting position of the second light beam in the second light-emitting region to move a second illumination region of the second light beam, in the same direction as the first illumination region, on the image forming region of the optical modulation device.

Further, according to another aspect of the present disclosure, a projector is provided that includes a light source including a first light-emitting region including a plurality of first light-emitting elements and configured to emit a first light beam, and a second light-emitting region including a plurality of second light-emitting elements and configured to emit a second light beam having a wavelength different from a wavelength of the first light beam, an optical modulation device configured to modulate the first light beam and the second light beam incident from the light source in accordance with image information, a projection optical device configured to project an image formed by the optical modulation device, and a control unit configured to control a light emission intensity of each of the plurality of first light-emitting elements and a light emission intensity of each of the plurality of second light-emitting elements. The control unit changes a light-emitting position of the first light beam in the first light-emitting region to move a first illumination region of the first light beam on an image forming region of the optical modulation device, and changes a light-emitting position of the second light beam in the second light-emitting region to move a second illumination region of the second light beam, in the same direction as the first illumination region, on the image forming region of the optical modulation device.

DESCRIPTION OF EXEMPLARY EMBODIMENTS

Figure 1:
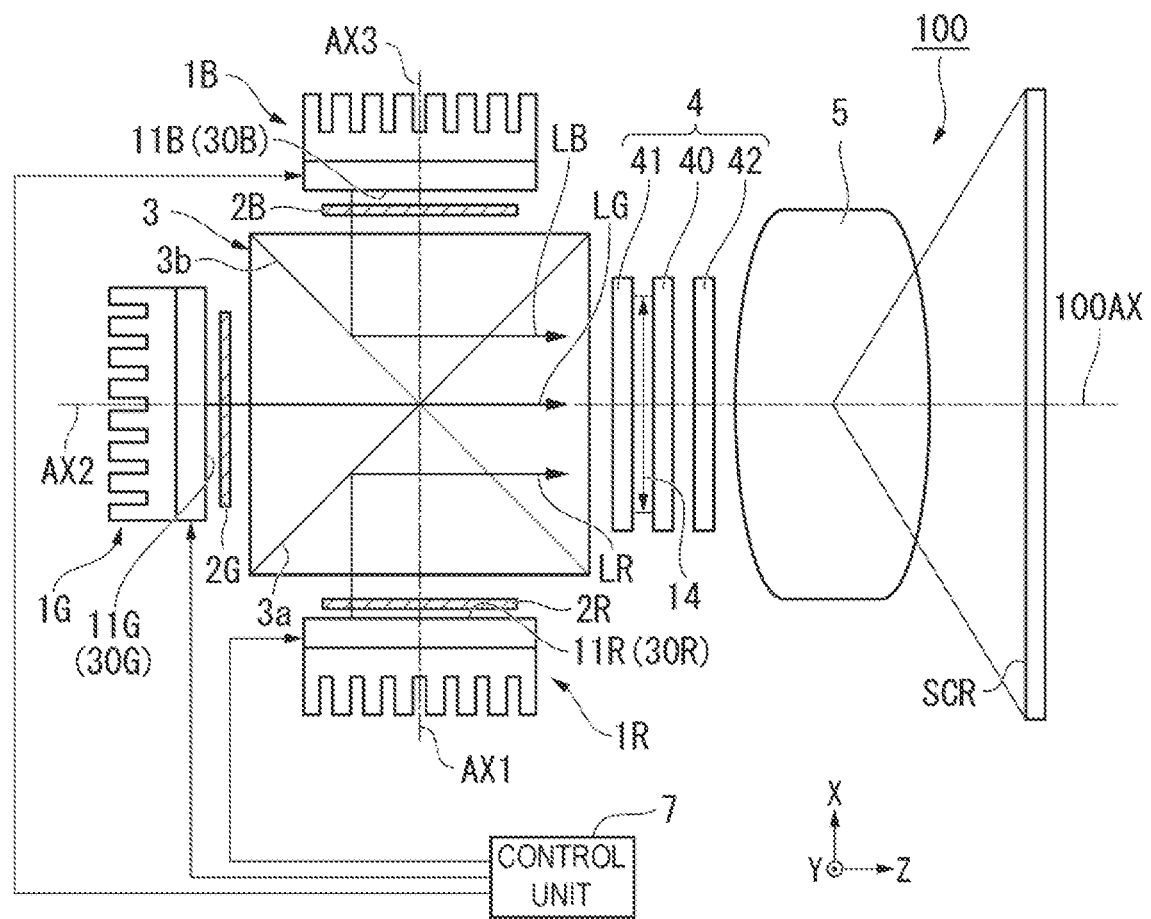
FIG. 1 is a plan view illustrating a schematic configuration of a projector according to a first embodiment.

Embodiments of the present disclosure will be described in detail below with reference to the accompanying drawings. Note that, in the drawings used for the following descriptions, characteristic portions are enlarged for convenience to make characteristics easily comprehensible in some cases, thus dimension ratios among respective constituent elements or the like are not necessarily the same as actual dimension ratios.

First Embodiment

FIG. 1 is a plan view illustrating a schematic configuration of a projector according to a first embodiment.

As illustrated in FIG. 1, a projector 100 according to this embodiment is a projection type image display device that projects an image on a screen SCR. The projector 100 includes a red light source (first light source) 1R, a green light source (second light source) 1G, a blue light source (third light source) 1B, a cross dichroic prism (optical system) 3, an optical modulation device 4, a projection optical device 5, a diffusion element (first diffusion element) 2R, a diffusion element (second diffusion element) 2G, a diffusion element (third diffusion element) 2B, and a control unit 7.

The red light source 1R, the green light source 1G, and the blue light source 1B emit a red light beam LR, a green light beam LG, and a blue light beam LB, respectively.

The red light source 1R includes a light-emitting region (first light-emitting region) 11R including a plurality of light-emitting elements (first light-emitting elements) 30R, and emits the red light beam (first light beam) LR from the light-emitting region 11R.

The green light source 1G includes a light-emitting region (second light-emitting region) 11G including a plurality of light-emitting elements (second light-emitting elements) 30G, and emits the green light beam (second light beam) LG from the light-emitting region 11G.

The blue light source 1B includes a light-emitting region (third light-emitting region) 11B including a plurality of light-emitting elements (third light-emitting elements) 30B, and emits the blue light beam (third light beam) LB from the light-emitting region 11B.

When the red light source 1R, the green light source 1G, and the blue light source 1B are collectively referred to without particular distinction, they will be referred to as each of the light sources 1R, 1G, and 1B. Further, when the red light beam LR, the green light beam LG, and the blue light beam LB emitted from each of the light sources 1R, 1G, and 1B, respectively, are collectively referred to without particular distinction, they will be referred to as each of the light beams LR, LG, and LB.

In this embodiment, an axis passing through the center of the light-emitting region 11R of the red light source 1R will be referred to as an optical axis AX1, an axis passing through the center of the light-emitting region of the green light source 1G will be referred to as an optical axis AX2, and an axis passing through the center of the light-emitting region of the blue light source 1B will be referred to as an optical axis AX3.

In this specification, the configuration of each portion will be described using an XYZ orthogonal coordinate system. Hereinafter, an axis parallel to the optical axis AX1 and the optical axis AX3 will be referred to as an X-axis, an axis parallel to the optical axis AX2 will be referred to as a Z-axis, and an axis perpendicular to the X-axis and the y-axis is referred to as a z-axis. Note that the optical axis AX2 extends along an illumination optical axis 100AX of the projector 100.

A direction along the X-axis will be referred to as an "X-axis direction". One side of the X-axis direction will be referred to as "one side in the X-axis direction (positive X side)", and the other side of the X-axis direction will be referred to as "the other side in the X-axis direction (negative X side)".

A direction along the Y-axis will be referred to as a "Y-axis direction". One side of the Y-axis direction will be referred to as "one side in the Y-axis direction (positive Y side)", and the other side of the Y-axis direction will be referred to as "the other side in the Y-axis direction (negative Y side)".

A direction along the Z-axis will be referred to as a "Z-axis direction". One side of the Z-axis direction will be referred to as "one side in the Z-axis direction (positive Z side)", and the other side of the Z-axis direction will be referred to as "the other side in the Z-axis direction (negative Z side)".

Each of the light beams LR, LG, and LB emitted from each of the light sources 1R, 1G, and 1B, respectively, is incident on the cross dichroic prism 3. The cross dichroic prism 3 is formed by bonding four right-angle prisms together, and, on inner surfaces of the cross dichroic prism 3, a first dichroic mirror 3a formed by a dielectric multilayer film that reflects the red light beam LR and transmits the green light beam LG, and a second dichroic mirror 3b formed by a dielectric multilayer film that reflects the blue light beam LB and transmits the green light beam LG are disposed forming a cross shape.

In this way, the cross dichroic prism 3 causes each of the light beams LR, LG, and LB emitted from each of the light sources 1R, 1G, and 1B, respectively, to be incident on the optical modulation device 4 such that travel directions of each of the light beams LR, LG, and LB are aligned with each other.

The optical modulation device 4 modulates each of the light beams LR, LG, and LB emitted from each of the light sources 1R, 1G, and 1B, respectively, in accordance with image information, and generates an image. The optical modulation device 4 includes an incidence-side polarizing plate 41, a liquid crystal panel 40, and an exit-side polarizing plate 42.

When viewed in the Z-axis direction, the planar shape of an image forming region 14 of the optical modulation device 4 is a rectangular shape. Further, the planar shape of each of the light-emitting regions 11R, 11G, and 11B of each of the light sources 1R, 1G, and 1B is a rectangular shape, and the planar shape of the image forming region 14 and the planar shape of each of the light-emitting regions 11R, 11G, and 11B are substantially similar to each other. The area of each of the light-emitting regions 11R, 11G, 11B is the same as the area of the image forming region 14, or is slightly larger than the area of the image forming region 14.

The projection optical device 5 enlarges an image that is formed by the optical modulation device 4, and projects the image onto the screen SCR. The projection optical device 5 is constituted by one or a plurality of projection lenses.

The basic configuration of each of the light sources 1R, 1G, and 1B is the same except that wavelength bands of the light beams emitted therefrom are different from each other. The configuration will be described in detail below using the red light source 1R as an example.

Figure 2:
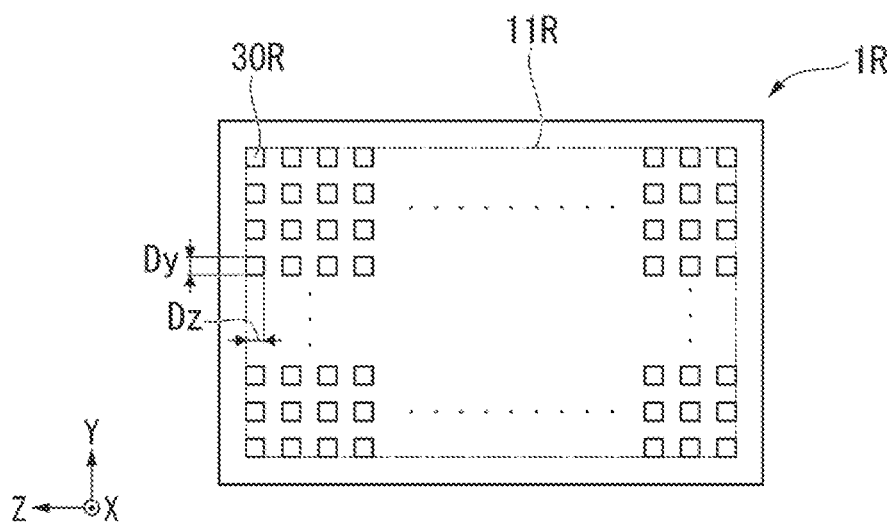
FIG. 2 is a plan view schematically illustrating a configuration of a red light source.

FIG. 2 is a plan view schematically illustrating a configuration of the red light source 1R. Note that in FIG. 2, in order to make it easier to view the diagram, only some of the light-emitting elements 30R included in the light-emitting region 11R are illustrated, and the other light-emitting elements 30R are not illustrated.

As illustrated in FIG. 2, in the red light source 1R, the plurality of light-emitting elements 30R are arranged in an array in the rectangular light-emitting region 11R. Each of the light-emitting elements 30R is arranged in an array along both the Y-axis direction (first direction) and the Z-axis direction (second direction). Note that each of the light-emitting elements 30R has the same shape.

In the red light source 1R according to this embodiment, the light-emitting elements 30R are arranged discretely in the light-emitting region 11R, and thus the heat dissipation performance of the light-emitting element 30R can be improved, and the light emission intensity of each of the light-emitting elements 30R can be increased.

Figure 3:
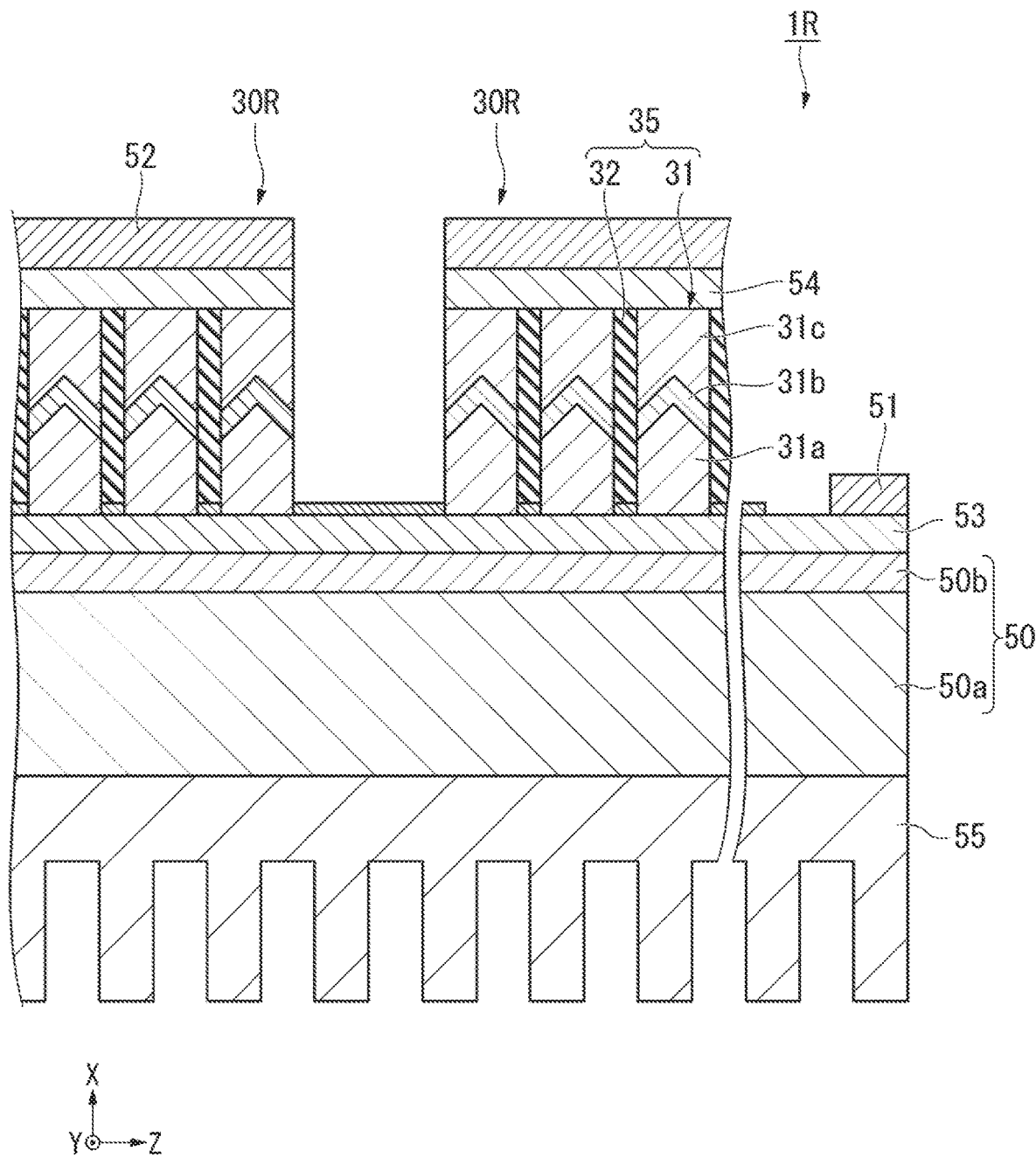
FIG. 3 is a cross-sectional view illustrating a configuration of main portions of the red light source.

FIG. 3 is a cross-sectional view illustrating a configuration of main portions of the red light source 1R.

As illustrated in FIG. 3, the red light source 1R includes a base substrate 50, the plurality of light-emitting elements 30R provided in an array on the base substrate 50, a first electrode 51, a second electrode 52, and a cooling member 55.

The base substrate 50 includes, for example, a substrate 50a and a reflection layer 50b. The substrate 50a is constituted, for example, by a silicon (Si) substrate, a gallium nitride (GaN) substrate, a sapphire substrate, or the like. The reflection layer 50b is provided on the substrate 50a. The reflection layer 50b is constituted, for example, by a stacked body in which AlGaN layers and a GaN layers are alternately stacked, a stacked body in which AlInN layers and GaN layers are alternately stacked, or the like. The reflection layer 50b reflects light generated in a light-emitting element, which will be described below, toward the opposite side from the substrate 50a. A heat sink as the cooling member 55 is provided at a surface of the substrate 50a on the opposite side from the reflection layer 50b.

The plurality of light-emitting elements 30R are each formed in an island shape on the base substrate 50 via the semiconductor layer 53. The semiconductor layer 53 is constituted, for example, by an n-type GaN layer, specifically, by a GaN layer doped with Si. The light-emitting elements 30R adjacent to each other are electrically separated by an element isolation layer (not illustrated) provided around the semiconductor layer 53. The element isolation layer is constituted, for example, by an i-type GaN layer, a silicon oxide layer, a silicon nitride layer, or the like.

Each of the light-emitting elements 30R is constituted by a photonic crystal structure 35. The photonic crystal structure 35 includes a plurality of columnar bodies 31 and a plurality of light propagation layers 32. The photonic crystal structure 35 is a columnar crystal structure that extends protruding upward from the semiconductor layer 53. The planar shape of the photonic crystal structure 35 is a polygonal shape, a circular shape, an oval shape, or the like. The diameter of the photonic crystal structure 35 is an nm order, and specifically, from 10 nm to 500 nm, for example. The dimension in the stacking direction of the photonic crystal structure 35, namely, the height of the photonic crystal structure 35 is from 0.1 µm to 5 µm, for example.

A plurality of the photonic crystal structures 35 are arranged at a predetermined pitch in a predetermined direction in plan view. The photonic crystal structure 35 can express the effect of the photonic crystal, and causes light emitted by the light-emitting element to be trapped in the in-plane direction of the base substrate 50 and exit in the stacking direction. Here, the in-plane direction of the base substrate 50 is a direction along a plane orthogonal to the stacking direction.

The photonic crystal structure 35 includes a first semiconductor layer 31a, a light-emitting layer 31b, and a second semiconductor layer 31c. Each of the layers constituting the photonic crystal structure 35 is formed by epitaxial growth.

The first semiconductor layer 31a is provided on the semiconductor layer 53. The first semiconductor layer 31a is provided between the base substrate 50 and the light-emitting layer 31b. The first semiconductor layer 31a is constituted, for example, by an n-type GaN layer doped with Si. In this embodiment, the first semiconductor layer 31a is constituted by the same material as the semiconductor layer 53.

The light-emitting layer 31b is provided on the first semiconductor layer 31a. The light-emitting layer 31b is provided between the first semiconductor layer 31a and the second semiconductor layer 31c. The light-emitting layer 31b has a quantum well structure constituted, for example, by a GaN layer and an InGaN layer. The light-emitting layer 31b emits light as a result of a current being injected via the first semiconductor layer 31a and the second semiconductor layer 31c. Note that the respective numbers of the GaN layer and the InGaN layer constituting the light-emitting layer 31b are not particularly limited. The light-emitting layer 31b emits red light.

The second semiconductor layer 31c is provided on the light-emitting layer 31b. The second semiconductor layer 31c is a layer that has a different type of conductivity from that of the first semiconductor layer 31a. The second semiconductor layer 31c is constituted, for example, by a p-type GaN layer doped with Mg. The first semiconductor layer 31a and the second semiconductor layer 31c function as cladding layers having a function of trapping light in the light-emitting layer 31b.

The light propagation layer 32 is provided surrounding the photonic crystal structure 35 in plan view. The refractive index of the light propagation layer 32 is lower than the refractive index of the light-emitting layer 31b. The light propagation layer 32 is, for example, a GaN layer or a titanium oxide ($TiO_2$) layer. The GaN layer constituting the light propagation layer 32 may be an i-type, an n-type, or a p-type. The light propagation layer 32 can propagate light generated in the light-emitting layer 31b in a planar direction.

In each of the columnar bodies 31, a pin diode is constituted by a stacked body formed by the p-type second semiconductor layer 31c, the light-emitting layer 31b that is not doped with impurities, and the n-type first semiconductor layer 31a. The band gaps of the first semiconductor layer 31a and the second semiconductor layer 31c are larger than the band gap of the light-emitting layer 31b. In each of the columnar bodies 31, when a current is injected between the first electrode 51 and the second electrode 52 by applying a forward bias voltage of the pin diode thereto, electrons and positive holes are recombined in the light-emitting layer 31b. Light is emitted as a result of this recombination.

The light generated in the light-emitting layer 31b is propagated through the light propagation layer 32 in the in-plane direction of the base substrate 50, by the first semiconductor layer 31a and the second semiconductor layer 31c. At this time, the light forms a standing wave due to the effect of the photonic crystal expressed by the photonic crystal structure 35, and is trapped in the in-plane direction of the base substrate 50. The trapped light receives a gain in the light-emitting layer 31b, resulting in laser oscillation. In other words, the light generated in the light-emitting layer 31b resonates in the in-plane direction of the base substrate 50 due to the photonic crystal structure 35, resulting in the laser oscillation. Specifically, the light generated in the light-emitting layer 31b resonates in the in-plane direction of the base substrate 50 in each of the light-emitting elements 30R constituted by the plurality of photonic crystal structures 35, resulting in the laser oscillation. After that, +1 order diffraction light and −1 order diffraction light generated by the resonance travel in the stacking direction (Z-axis direction) as laser light.

In the red light source 1R, the refractive index and the thicknesses of the first semiconductor layer 31a, the second semiconductor layer 31c, and the light-emitting layer 31b are designed so that the intensity of the light propagating in the planar direction becomes greatest in the light-emitting layer 31b in the Z-axis direction.

In this embodiment, of the laser light traveling in the stacking direction, the laser light traveling toward the substrate 50a side is reflected by the reflection layer 50b and travels toward the second electrode 52 side. As a result, the red light source 1R can emit, from the second electrode 52 side, a red light beam, for example, having the peak in a wavelength band from 610 nm to 750 nm.

The first electrode 51 is provided on the semiconductor layer 53 on a lateral side of the photonic crystal structure 35. The first electrode 51 may be in ohmic contact with the semiconductor layer 53. In an example illustrated in FIG. 3, the first electrode 51 is electrically coupled to the first semiconductor layer 31a via the semiconductor layer 53. The first electrode 51 is one of electrodes for injecting the current into the light-emitting layer 31b. As the first electrode 51, a laminated film in which a Ti layer, an Al layer, and an Au layer are laminated in this order from the semiconductor layer 53 side, or the like is used.

The second electrode 52 is provided on the semiconductor layer 54. The semiconductor layer 54 is provided on the photonic crystal structure 35. The semiconductor layer 54 is constituted, for example, by a p-type GaN layer doped with Mg.

The second electrode 52 may be in ohmic contact with the semiconductor layer 54. The second electrode 52 is electrically coupled to the second semiconductor layer 31c. In the example illustrated in FIG. 3, the second electrode 52 is electrically coupled to the second semiconductor layer 31c via the semiconductor layer 54. The second electrode 52 is the other of the electrodes for injecting the current into the light-emitting layer 31b. As the second electrode 52, indium tin oxide (ITO) is used, for example. The second electrode 52 provided on one of the adjacent photonic crystal structures 35 is electrically coupled to the second electrode 52 provided on the other of the adjacent photonic crystal structures 35 by a wiring line (not illustrated).

Here, the light distribution angle of the light emitted from the light-emitting element 30R constituted by the photonic crystal structure 35 is controlled in accordance with the planar shape of the light-emitting element 30R. In the case of this embodiment, as illustrated in FIG. 2, the planar shape of the light-emitting element 30R is a square shape. In other words, in plan view, a length Dz in the Z-axis direction of each of the light-emitting elements 30R is equal to a length Dy in the Y-axis direction of each of the light-emitting elements 30R. In this way, when the length Dz and the length Dy of the light-emitting element 30R are equal to each other, the light distribution angle along the Z-axis direction of the light emitted from the light-emitting element 30R is equal to the light distribution angle along the Y-axis direction thereof. Note that the light distribution angle is defined as an angle formed by an outermost light beam exiting from the central light emission point and the normal line passing through that light emission point.

As illustrated in FIG. 1, by controlling the light emission of the light-emitting elements 30R in such a manner as will be described below, the red light source 1R emits the red light beam LR from the light-emitting region 11R. The red light beam LR emitted from the red light source 1R is incident on the diffusion element 2R. For example, as the diffusion element 2R, a surface diffusion plate formed by a transparent flat plate having an uneven surface structure, a refractive index distribution type diffusion plate having a refractive index distribution inside a transparent flat plate, a diffraction element, a hologram element, a meta-lens element, or the like can be used.

The diffusion element 2R diffuses the red light beam LR to cause adjacent light beams constituting the red light beam LR to partially overlap with each other. As a result, the intensity distribution in the red light beam LR can be made substantially uniform at a position separated from the red light source 1R by a predetermined distance. Specifically, diffusion characteristics of the diffusion 2R are set such that the intensity distribution of the red light beam LR is substantially uniform on the image forming region 14 of the optical modulation device 4.

In this embodiment, the green light source 1G having a configuration similar to that of the red light source 1R includes the plurality of light-emitting elements 30G provided in an array, and, for example, emits green light having the peak in a wavelength band from 495 nm to 610 nm from each of the light-emitting elements 30G. In the light-emitting region 11G of the green light source 1G, each of the light-emitting elements 30G is arranged in an array along both the Y-axis direction (third direction) and the X-axis direction (fourth direction).

Similarly to the red light source 1R, the green light source 1G emits the green light beam LG from the light-emitting region 11G by controlling the light emission of the light-emitting elements 30G. The green light beam LG emitted from the green light source 1G is incident on the diffusion element 2G. The diffusion element 2G has a configuration similar to that of the diffusion element 2R. Diffusion characteristics of the diffusion element 2G are set such that the intensity distribution of the green light beam LG is substantially uniform on the image forming region 14 of the optical modulation device 4.

Further, the blue light source 1B having a configuration similar to that of the red light source 1R includes the plurality of light-emitting elements 30B provided in an array, and, for example, emits blue light having the peak in a wavelength band from 400 nm to 495 nm from each of the light-emitting elements 30B.

Similarly to the red light source 1R, the blue light source 1B emits the blue light beam LB from the light-emitting region 11B by controlling the light emission of the light-emitting elements 30B. The blue light beam LB emitted from the blue light source 1B is incident on the diffusion element 2B. The diffusion element 2B has a configuration similar to those of the diffusion elements 2R and 2G. Note that diffusion characteristics of the diffusion element 2B are set such that the intensity distribution of the blue light beam LB is substantially uniform on the image forming region 14 of the optical modulation device 4.

Note that, if necessary, a diffusion element may be further disposed between the cross dichroic prism 3 and the optical modulation device 4 in order to cause the intensity distribution of each of the light beams that illuminates the image forming region 14 of the optical modulation device 4 to be more uniform. Alternatively, instead of disposing the diffusion elements immediately after each of the light sources 1R, 1G, and 1B, the diffusion element may be disposed between the cross dichroic prism 3 and the optical modulation device 4.

Figure 4:
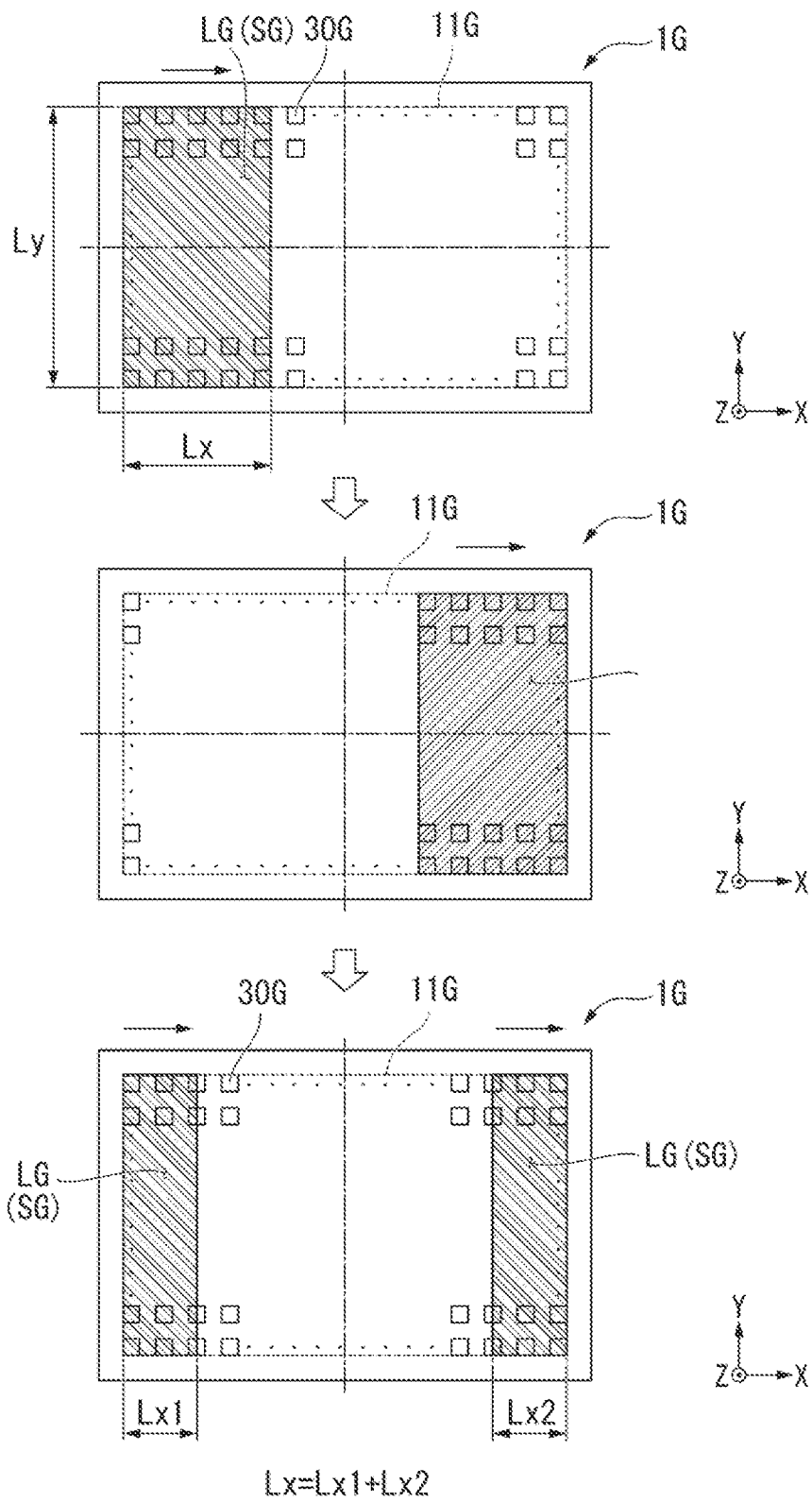
FIG. 4 is a diagram illustrating an operation of each of light-emitting elements of a green light source.

The control unit 7 independently controls the light emission of each of the light-emitting elements 30R, 30G, and 30B in each of the light sources 1R, 1G, and 1B. Each of the light-emitting elements 30R, 30G, and 30B is controlled in the same manner in each of the light sources 1R, 1G, and 1B. Below, the control of each of the light-emitting elements 30G of the green light source 1G that emits the green light beam LG will be described as an example, the green light beam LG being transmitted through the cross dichroic prism 3 and illuminating the image forming region 14 of the optical modulation device 4. FIG. 4 is a diagram illustrating an operation of each of the light-emitting elements 30G of the green light source 1G. In FIG. 4, changes in the light emission state at each of predetermined timings are illustrated in order from the top to the bottom. Note that in this embodiment, the control unit 7 controls the light emission of each of the light-emitting elements 30R, 30G, and 30B in each of the light sources 1R, 1G, and 1B. However, the embodiment is not limited to this example, and the embodiment may include a plurality of control units. In other words, the embodiment may include a first control unit that is provided corresponding to the light source 1R to control the light emission of the light-emitting elements 30R in the light source 1R, a second control unit that is provided corresponding to the light source 1G to control the light emission of the light-emitting elements 30G in the light source 1G, and a third control unit that is provided corresponding to the light source 1B to control the light emission of the light-emitting elements 30B in the light source 1B.

As illustrated in FIG. 4, the control unit 7 illustrated in FIG. 1 causes the light-emitting elements 30G aligned in the Y-axis direction in the green light source 1G to emit light simultaneously, causing the light-emitting elements 30G aligned in the X-axis direction to emit light intermittently at predetermined timings, and sequentially moves the light-emitting positions of the light-emitting elements 30G in the X-axis direction.

Since the control unit 7 integrally controls the light emission state of the light-emitting elements 30G aligned in the Y-axis direction, the configuration of a driving circuit and a control circuit is simplified in the Y-axis direction, thereby achieving a cost reduction. Further, in the green light source 1G, the control unit 7 of this embodiment sequentially moves the light-emitting position of the green light beam LG in the light-emitting region 11G. As a result, heat from the light-emitting region 11G is dissipated during a non-light emission period, and thus a cooling performance of the green light source 1G can be improved. Thus, the light emission intensity of the green light source 1G can be further increased, and the light emission luminance of the green light beam LG can be increased.

In this way, the light-emitting region 11G of the green light source 1G emits the green light beam LG having a rectangular shape extending in the Y-axis direction at the predetermined timings. Here, the dimension in the X-axis direction of the green light beam LG emitted from the light-emitting region 11G is defined as Lx, and the dimension in the Y-axis direction thereof is defined as Ly. The green light beam LG has a shape extending in the Y-axis direction. In other words, in this embodiment, the length direction of the green light beam LG corresponds to the Y-axis direction (third direction), and the width direction of the green light beam LG corresponds to the X-axis direction (fourth direction).

In the light-emitting region 11G of the green light source 1G, the light-emitting position of the green light beam LG moves sequentially to the right side (positive X side) at each of the predetermined timings. Then, as illustrated in the bottom section of FIG. 4, when reaching the right end (an end portion on the positive X side), the light-emitting position moves instantaneously to the left end (an end portion on the negative X side), and again, the light-emitting position moves sequentially to the right side (positive X side). In other words, at a certain timing, the green light beam LG is constituted by two light beams emitted respectively from positions separated from each other in the X-axis direction. Note that the sum (Lx1+Lx2) of dimensions Lx1 and Lx2 in the X-axis direction of the two light beams is equal to the dimension Lx of the green light beam LG obtained before the separation. In other words, even when the green light beam LG is separated into the two light beams, since the relationship of Lx=Lx1=Lx2 is satisfied, the light emission area always remains constant.

The control unit 7 controls the light emission intensity by turning on or off each of the plurality of light-emitting elements 30G, and changes the light-emitting position of the green light beam LG in the light-emitting region 11G. Thus, the green light source 1G moves an illumination region (second illumination region) SG of the green light beam LG on the image forming region 14 of the optical modulation device 4.

The light beam from each of the light-emitting elements 30G constituting the green light beam LG is diffused by the diffusion element 2G such that the intensity distribution thereof becomes substantially uniform. Thus, the illumination region SG of the green light beam LG illuminates the image forming region 14 of the optical modulation device 4 at a substantially uniform intensity.

Similarly to the green light source 1G, the control unit 7 controls the light emission intensity by turning on or off each of the plurality of light-emitting elements 30R in the red light source 1R, and changes the light-emitting position of the red light beam LR in the light-emitting region 11R. In this way, the control unit 7 causes the light-emitting position of the red light beam LR to move cyclically on the light-emitting region 11R. As a result, the control unit 7 moves an illumination region of the red light beam LR on the image forming region 14 of the optical modulation device 4. The planar shape of the red light beam LR is a rectangular shape extending in the Y-axis direction. The planar shape of the red light beam LR is the same as those of the green light beam LG and the blue light beam LB.

The light beam from each of the light-emitting elements 30R constituting the red light beam LR is diffused by the diffusion element 2R such that the intensity distribution thereof becomes substantially uniform. Thus, an illumination region (first illumination region) SR of the red light beam LR illuminates the image forming region 14 of the optical modulation device 4 at a substantially uniform intensity.

Similarly to the green light source 1G, the control unit 7 controls the light emission intensity by turning on or off each of the plurality of light-emitting elements 30B, and changes the light-emitting position of the blue light beam LB in the light-emitting region 11B. In this way, the control unit 7 causes the light-emitting position of the blue light beam LB to move cyclically on the light-emitting region 11B. As a result, the control unit 7 moves an illumination region of the blue light beam LB on the image forming region 14 of the optical modulation device 4.

The planar shape of the blue light beam LB has a rectangular shape extending in the Y-axis direction. In other words, the length direction of the blue light beam LB corresponds to the Y-axis direction, and the width direction of the blue light beam LB corresponds to the Z-axis direction.

The light beam from each of the light-emitting elements 30B constituting the blue light beam LB is diffused by the diffusion element 2B such that the intensity distribution thereof becomes substantially uniform. Thus, an illumination region SB of the blue light beam LB illuminates the image forming region 14 of the optical modulation device 4 at a substantially uniform intensity.

Figure 5:
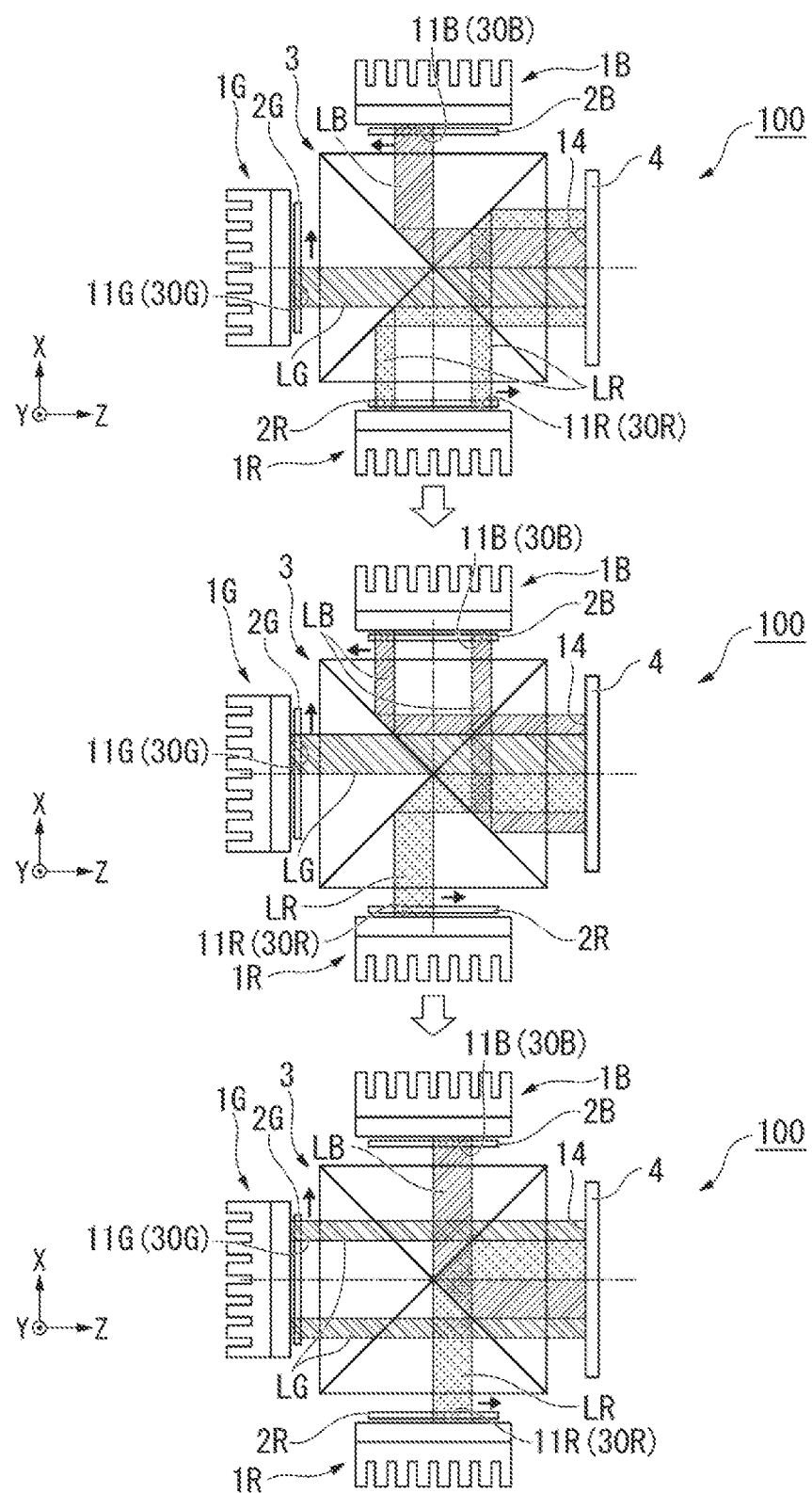
FIG. 5 is a diagram illustrating states in which each of light beams illuminates an image forming region of an optical modulation device.
Figure 6:
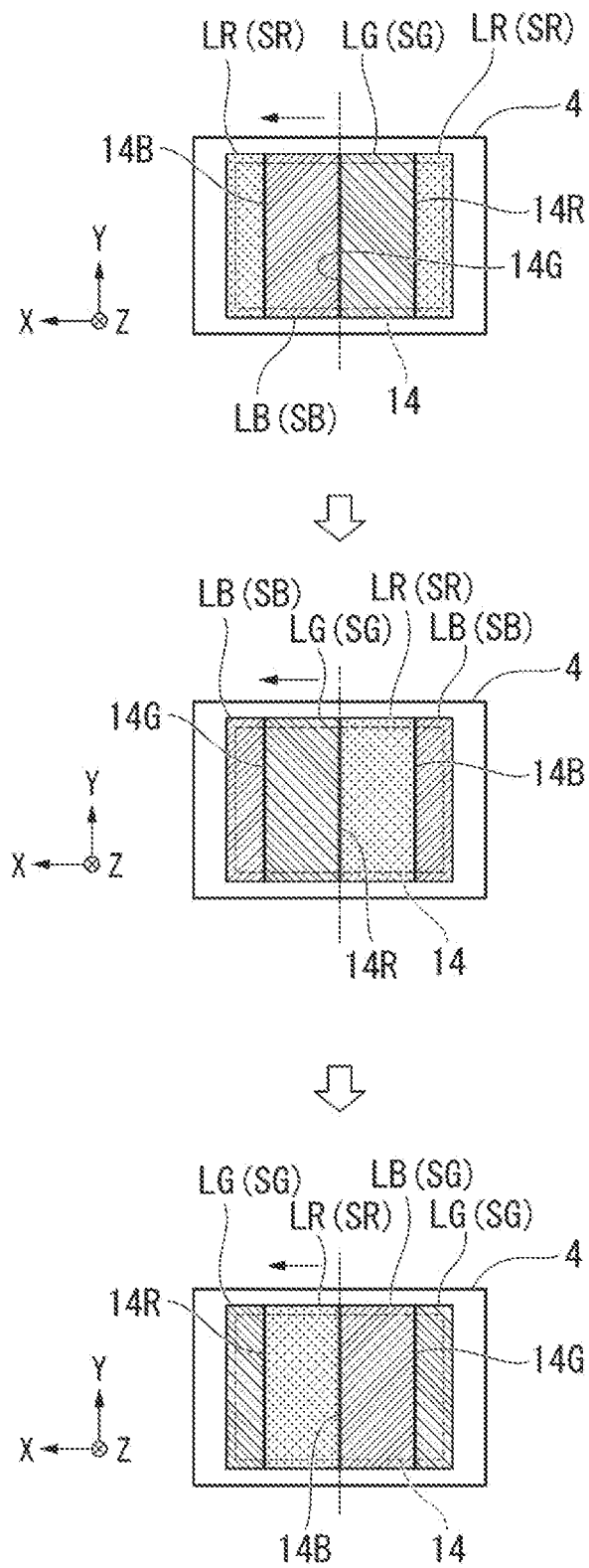
FIG. 6 is a diagram of the image forming region of the optical modulation device when viewed from the front.

FIG. 5 is a diagram illustrating states in which each of the light beams LR, LG, and LB emitted from each of the light sources 1R, 1G, and 1B illuminates the image forming region 14 of the optical modulation device 4, when viewed from the positive Y side. FIG. 6 is a diagram of the image forming region of the optical modulation device when viewed from the front. FIG. 5 and FIG. 6 illustrate changes in the illumination state of the image forming region 14 at each of the predetermined timings, in order from the top to the bottom. FIG. 5 and FIG. 6 correspond to each other. Note that in FIG. 5, the optical modulation device 4 is illustrated in a simplified manner.

As illustrated in FIG. 5 and FIG. 6, by causing each of the light beams LR, LG, and LB emitted from each of the light sources 1R, 1G, and 1B to be synchronized such that the respective light beams LR, LG, and LB do not overlap with each other, the projector 100 of this embodiment illuminates the image forming region 14 of the optical modulation device 4 while causing each of the light beams LR, LG, and LB to scan over the image forming region 14. The illumination regions SR, SG, and SB of each of the light beams LR, LG, and LB move in the same direction without overlapping with each other on the image forming region 14. In this embodiment, the illumination regions SR, SG, and SB of each of the light beams LR, LG, and LB do not overlap with each other on the image forming region 14. However, the embodiment is not limited to this example, and the illumination regions SR, SG, and SB may overlap with each other on the image forming region 14 as long as the overlap is not visually recognizable.

Specifically, the red light source 1R cyclically moves the light-emitting position of the red light beam LR from the negative Z side toward the positive Z side on the light-emitting region 11R. In this way, as a result of passing through the cross dichroic prism 3, the red light beam LR emitted from the red light source 1R scans the illumination region SR in the direction from the negative X side toward the positive X side on the image forming region 14 of the optical modulation device 4.

The green light source 1G cyclically moves the light-emitting position of the green light beam LG on the light-emitting region 11G from the negative X side toward the positive X side. In this way, as a result of passing through the cross dichroic prism 3, the green light beam LG emitted from the green light source 1G scans the illumination region SG in the direction from the negative X side toward the positive X side on the image forming region 14 of the optical modulation device 4.

The blue light source 1B cyclically moves the light-emitting position of the blue light beam LB on the light-emitting region 11B from the positive Z side to the negative Z side. In this way, as a result of passing through the cross dichroic prism 3, the blue light beam LB emitted from the blue light source 1B scans the illumination region SB in the direction from the negative X side toward the positive X side on the image forming region 14 of the optical modulation device 4.

In this embodiment, the dimension of each of the lighting regions SR, SG, and SB is larger than the dimension of the image forming region 14 of the optical modulating device 4 with respect to the Y-axis direction, and the size of each of the light beams LR, LG, and LB is set to be, for example, equal to or less than ⅓ of the size of the image forming region 14 of the optical modulating device 4 with respect to the X-axis direction.

In this embodiment, since the light beams LR, LG, and LB are diffused as a result of being transmitted through the diffusion elements 2R, 2G, and 2B, respectively, and the intensity distribution of each of the light beams LR, LG, and LB becomes substantially uniform, each of the light beams LR, LG, and LB illuminates the image forming region 14 of the optical modulation device 4 in the substantially uniform manner.

Next, writing of the image information with respect to the optical modulation device 4 will be described. In this embodiment, the optical modulation device 4 simultaneously writes red light image information, green light image information, and blue light image information to each pixel of the image forming region 14 that is constituted by the liquid crystal panel 40.

Specifically, as illustrated in FIG. 6, the optical modulation device 4 includes three scanning lines 14R, 14G, and 14B along the Y-axis direction of the image forming region 14, and simultaneously writes the red light image information, the green image information, and the blue light image information corresponding to the light beams LR, LG, and LB, respectively, to each of the scanning lines 14R, 14G, and 14B. Note that, in consideration of the response rate of the liquid crystal panel 40, it is desirable to illuminate the image forming region 14 with each of the light beams LR, LG, and LB with a slight delay after the writing of the image information.

In the optical modulating device 4 of this embodiment, a red image, a green image, and a blue image corresponding to the light beams LR, LG, and LB, respectively, are always formed together in the image forming region 14. The optical modulation device 4 sequentially moves the three scanning lines 14R, 14G, and 14B to the positive X side while keeping the intervals in the X-axis direction between the three scanning lines 14R, 14G, and 14B constant. Here, when each of the scanning lines 14R, 14G, and 14B reaches a left end portion (an end portion on the positive X side) of the image forming region 14, each of the scanning lines 14R, 14G, and 14B moves instantaneously to a right end portion (an end portion on the negative X side) of the image forming region 14, and again, moves in the positive X-axis direction.

In this way, by irradiating a predetermined position of the image forming region 14 with each of the light beams LR, LG, and LB corresponding to the image information in synchronization with the writing of the image information onto the image forming region 14, and sequentially moving the illumination position of each of the light beams LR, LG, and LB in accordance with the movement of the writing position of the image information, the optical modulation device 4 of this embodiment forms an image constituted by three colors and corresponding to one frame. In this manner, the image formed on the image forming region 14 of the optical modulation device 4 is recognized by the human eye as a color image due to the afterimage effect.

As described above, according to the projector 100 of this embodiment, by cyclically moving the illumination regions SR, SG, and SB of the light beams LR, LG, and LB emitted from the light sources 1R, 1G, and 1B, respectively, in one direction on the image forming region 14 of the optical modulation device 4, a color image can be displayed using the single optical modulation device 4 without using a rotating prism. Thus, the projector 100 can be provided that can display a color image with a small configuration.

In this embodiment, since the image forming region 14 can be illuminated in a state in which the light beams LR, LG, and LB do not overlap with each other, a degradation in the image quality, which occurs when the light beams LR, LG, and LB partially overlap with each other, can be suppressed.

Further, in the projector 100 of this embodiment, by using a surface light source, which uses light-emitting elements each constituted by a photonic crystal structure, as each of the light sources 1R, 1G, and 1B, the configuration can be easily realized in which the illumination regions SR, SG, and SB of the light beams LR, LG, and LB are caused to move cyclically in one direction on the image forming region 14 of the optical modulating device 4.

Further, in the projector 100 of this embodiment, the light beams LR, LG, and LB are diffused by the diffusion elements 2R, 2G, and 2B, respectively, and thus each of the illumination regions SR, SG, and SB can illuminate the image forming region 14 of the optical modulation device 4 with a uniform light intensity distribution. As a result, it is possible to further improve the image quality of a projection image by the projector 100.

In the projector 100 of this embodiment, each of the light beams LR, LG, and LB is coherent light, and thus a speckle may be generated in the projection image. However, in this embodiment, each of the light beams LR, LG, and LB of each of the light sources 1R, 1G, and 1B is generated by causing light emitted from the light-emitting elements 30R, 30G, and 30B to partially overlap with each other, the light-emitting elements 30R, 30G, and 30B emitting the light independently. For example, since phases of the light emitted from each of the light-emitting elements 30R are different from each other, by causing the adjacent light beams of each of the light-emitting elements 30R to overlap with each other, a speckle pattern in the red light beam LR is temporally or spatially averaged, and becomes less likely to be visually recognized. Further, the same also applies to the green light beam LG and the blue light beam LB. Thus, according to the projector 100 of this embodiment, by suppressing the occurrence of the speckle in the projection image, an image of a higher image quality can be displayed.

Further, in the projector 100 of this embodiment, the length direction (Y-axis direction), in which each of the illumination regions SR, SG, and SB extends, extends along the shorter-side direction (Y-axis direction) of the rectangular image forming region 14. Thus, the size of each of the illumination regions SR, SG, and SB can be reduced compared to a case in which the longer sides of the illumination regions SR, SG, and SB are aligned with the longitudinal direction of the image forming region 14. Thus, it becomes easier to increase the uniformity of the intensity distribution of the illumination regions SR, SG, and SB. As a result, the image forming region 14 of the optical modulation device 4 can be illuminated with a uniform illuminance distribution, and the image quality of the projection image can thus be further improved.

First Modified Example of First Embodiment

Next, a first modified example of the projector according to the first embodiment will be described. A difference between this modified example and the first embodiment is the planar shape of each of the light-emitting elements 30R, 30G, and 30B in each of the light sources 1R, 1G, and 1B, and the other configurations are the same. Thus, below, the same member or configuration as that of the first embodiment will be given the same reference sign, and a detailed description thereof will be omitted.

In the first embodiment, a case is described as an example in which the planar shape of each of the light-emitting elements 30R, 30G, and 30B in each of the light sources 1R, 1G, and 1B is a square shape, but the planar shape of each of the light-emitting elements 30R, 30G, and 30B is not limited to this example.

Below, a configuration of this modified example will be described using the red light source 1R as an example, but the same also applies to the configurations of the green light source 1G and the blue light source 1B.

Figure 7:
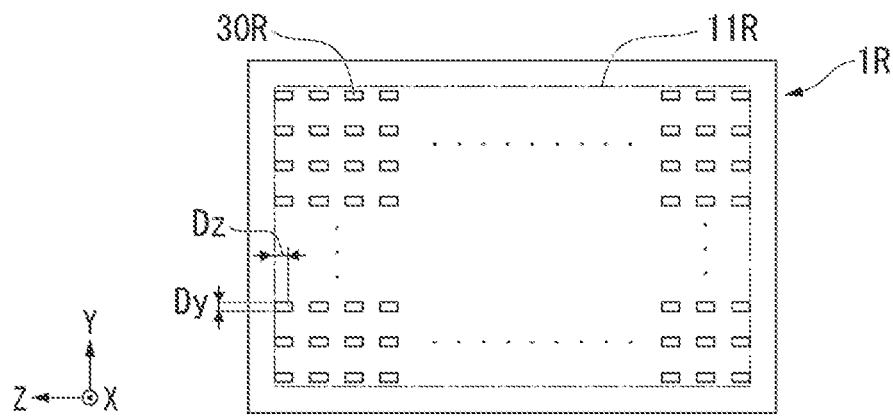
FIG. 7 is a plan view illustrating a configuration of a first modified example of the first embodiment.

FIG. 7 is a plan view schematically illustrating the configuration of the red light source 1R of this modified example.

As illustrated in FIG. 7, in this modified example, the planar shape of the light-emitting element 30R is a rectangular shape. In other words, when the light-emitting region 11R is viewed in plan view, the length Dy in the Y-axis direction of each of the light-emitting elements 30R is smaller than the length Dz in the Z-axis direction of each of the light-emitting elements 30R. In this way, when the planar shape of the light-emitting element 30R constituted by the photonic crystal structure 35 is a rectangular shape with the shorter sides extending in the Y-axis direction, the resonance length in the Y-axis direction is reduced. Thus, the light distribution angle along the Y-axis direction of the light emitted from the light-emitting element 30R becomes larger than the light distribution angle thereof along the Z-axis direction. As a result, in the Y-axis direction, the adjacent light beams emitted from each of the light-emitting elements 30R easily overlap with each other. Thus, it is possible to further increase the uniformity of the intensity distribution in the Y-axis direction of the red light beam LR emitted from the red light source 1R.

Further, according to the configuration of this modified example, since the arrangement distance between the adjacent light-emitting elements 30R in the Y-axis direction of the light-emitting region 11R is relatively expanded, the heat dissipation performance of the light-emitting element 30R is improved, and the light emission intensity of each of the light-emitting elements 30R can be increased.

Second Modified Example of First Embodiment

Next, a second modified example of the projector according to the first embodiment will be described. A difference between this modified example and the first modified example is the planar shape of each of the light-emitting elements 30R, 30G, and 30B in each of the light sources 1R, 1G, and 1B. Thus, below, the same member or configuration as that of the first embodiment and the first modified example will be given the same reference sign, and detailed description thereof will be omitted.

Below, a configuration of this modified example will be described using the red light source 1R as an example, but the same also applies to the configurations of the green light source 1G and the blue light source 1B.

Figure 8:
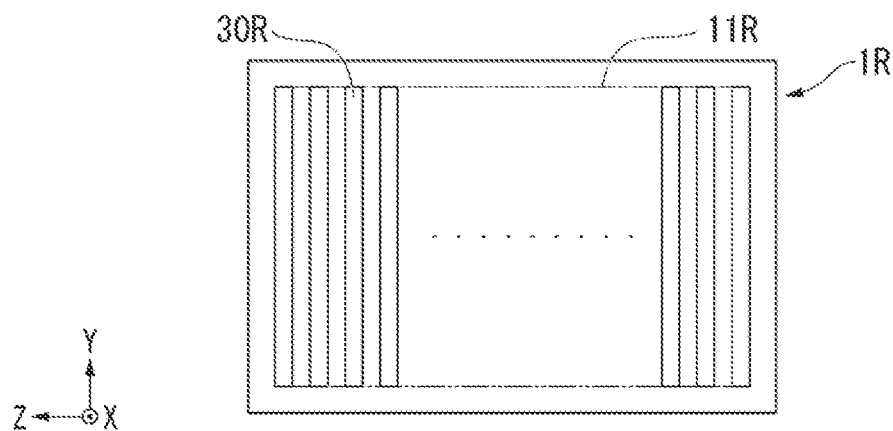
FIG. 8 is a plan view illustrating a configuration of a second modified example of the first embodiment.

FIG. 8 is a plan view schematically illustrating the configuration of the red light source 1R of this modified example.

As illustrated in FIG. 8, in this modified example, the planar shape of the light-emitting element 30R is an elongated rectangular shape. In other words, when the light-emitting region 11R is viewed in plan view, each of the plurality of light-emitting elements 30R has a strip shape that is elongated in the Y-axis direction in which the red light beam LR extends, and is arranged along the Z-axis direction orthogonal to the Y-axis direction.

According to the red light source 1R of this modified example, since the light-emitting elements 30R each having the rectangular shape that is elongated in the Y-axis direction are provided, the number of light-emitting elements 30R formed on the light-emitting region 11R can be reduced compared to the configuration of the first embodiment or the first modified example. Thus, by reducing the number of light-emitting elements, a driving circuit, a control circuit, and the like for driving or controlling the red light source 1R can be simplified, and a cost reduction can be achieved.

Third Modified Example of First Embodiment

Next, a third modified example of the projector according to the first embodiment will be described. A difference between this modified example and the first embodiment is the diffusion characteristics of the diffusion elements 2R, 2G, and 2B provided in each of the light sources 1R, 1G, and 1B, respectively. Thus, the same member or configuration as that of the first embodiment will be given the same reference sign, and detailed description thereof will be omitted.

Below, the configuration of this modified example will be described using the diffusion element 2R corresponding to the red light source 1R as an example, but the same also applies to the configurations of the diffusion elements 2G and 2B.

Figure 9:
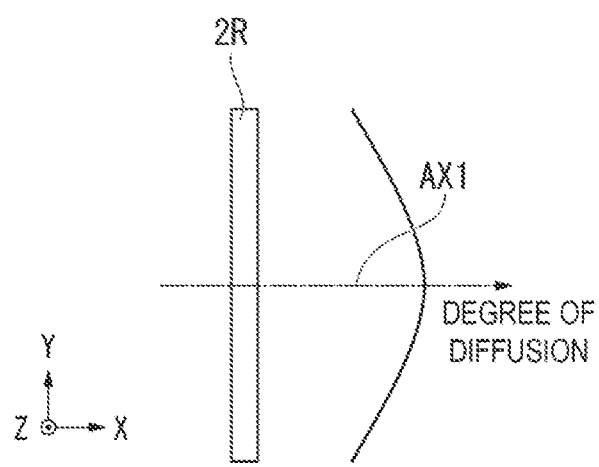
FIG. 9 is a plan view illustrating a configuration of a third modified example of the first embodiment.

FIG. 9 is a side cross-sectional view schematically illustrating the diffusion characteristics of the diffusion element 2R according to this modified example. Note that in FIG. 9, the red light source 1R that emits the red light beam LR toward the diffusion element 2R is not illustrated.

As illustrated in FIG. 9, in this modified example, the diffusion element 2R has different degrees of diffusion depending on the position in the length direction (Y-axis direction) of the red light beam LR. In this modified example, the degree of diffusion in the Y-axis direction of the diffusion element 2R is greatest on an optical axis AX1, and the degree of diffusion decreases as the red light beam LR is separated from the optical axis AX1 to the positive Y side or the negative Y side. In other words, as the diffusion characteristics of the diffusion element 2R according to this modified example, the degrees of diffusion on the positive Y side and the degrees of diffusion on the negative Y side are symmetrical to each other with respect to the optical axis AX1 of the red light source 1R. Note that having a large degree of diffusion means that the diffusion angle after being transmitted through the diffusion element is relatively large.

Here, in the diffusion element 2R of the first embodiment, the diffusion characteristics in the Y-axis direction are constant. Thus, the shape of the red light beam LR at the end portion thereof after being transmitted through the diffusion element 2R is significantly deformed, and the intensity distribution easily deteriorates. In contrast, in the diffusion element 2R of this modified example, the diffusion angle is caused to be relatively large in a center portion in the Y-axis direction of the diffusion element 2R and to get relatively smaller toward end portions in the Y-axis direction of the diffusion element 2R. As a result, the deformation of the shape of the red light beam LR at the end portions thereof can be suppressed, and it is possible to efficiently illuminate the image forming region 14 of the optical modulation device 4.

Note that, in the case of this modified example, it is desirable to adjust the light emission intensity of the light-emitting elements 30R arranged in the Y-axis direction of the red light source 1R in accordance with the diffusion characteristics of the diffusion element 2R. As the diffusion angle by the diffusion element 2R increases, the light density of the red light beam LR is more likely to decrease. Thus, for example, by setting, in advance, the light-emitting element 30R corresponding to the central portion of the diffusion element 2R, which has a large diffusion angle, to have a higher light emission intensity than that of the light-emitting element 30R corresponding to the end portion of the diffusion element 2R, which has a small diffusion angle, the decrease in the intensity distribution at the end portions of the red light beam LR is suppressed, and a uniform intensity distribution similar to a so-called top hat type can be obtained in the Y-axis direction.

Second Embodiment

Next, a projector according to a second embodiment will be described. A difference between this embodiment and the first embodiment is that a polarization conversion element is disposed between each of the light sources 1R, 1G, and 1B and each of the diffusion elements 2R, 2G, and 2B. Below, the same member or configuration as that of the first embodiment will be given the same reference sign, and detailed description thereof will be omitted.

Figure 10:
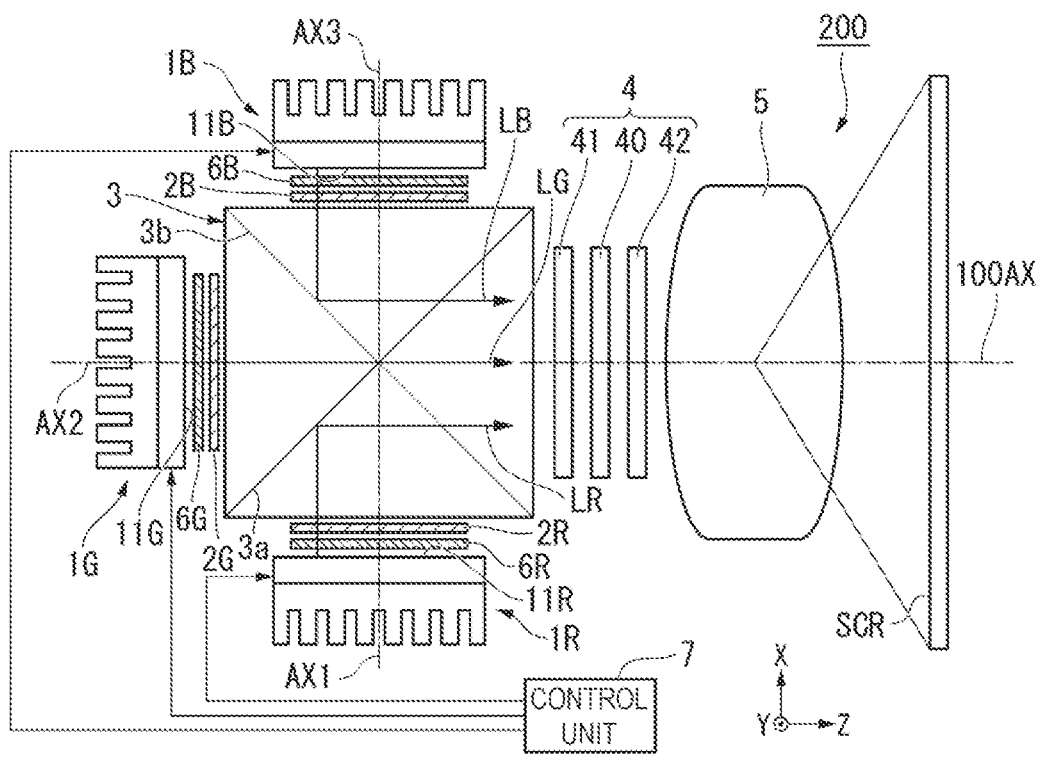
FIG. 10 is a plan view illustrating a schematic configuration of a projector according to a second embodiment.

FIG. 10 is a plan view illustrating a schematic configuration of the projector according to this embodiment.

As illustrated in FIG. 10, a projector 200 according to this embodiment includes each of the light sources 1R, 1G, and 1B, each of the diffusion elements 2R, 2G, 2B, the cross dichroic prism 3, the optical modulation device 4, the projection optical device 5, a polarization conversion element (first polarization conversion element) 6R, a polarization conversion element (second polarization conversion element) 6G, a polarization conversion element (third polarization conversion element) 6B, and the control unit 7.

The polarization conversion element 6R is disposed on the light emission side of the red light source 1R, and converts the polarization direction of the red light beam LR into a polarization direction corresponding to the optical modulation device 4. The polarization conversion element 6R is disposed between the red light source 1R and the diffusion element 2R.

The polarization conversion element 6G is disposed on the light emission side of the green light source 1G, and converts the polarization direction of the green light beam LG into a polarization direction corresponding to the optical modulation device 4. The polarization conversion element 6G is disposed between the green light source 1G and the diffusion element 2G.

The polarization conversion element 6B is disposed on the light emission side of the blue light source 1B, and converts the polarization direction of the blue light beam LB into a polarization direction corresponding to the optical modulation device 4. The polarization conversion element 6B is disposed between the blue light source 1B and the diffusion element 2B.

Below, when the polarization conversion element 6R, the polarization conversion element 6G, and the polarization conversion element 6B are collectively referred to without particular distinction, they will be referred to as each of the polarization conversion elements 6R, 6G, and 6B.

In this embodiment, each of the polarization conversion elements 6R, 6G, and 6B converts the polarization direction of each of the light beams LR, LG, and LB to a polarization direction in which each of the light beams LR, LG, and LB is transmitted through the incidence-side polarizing plate 41 of the optical modulation device 4.

The basic configuration of each of the polarization conversion elements 6R, 6G, and 6B is the same except that wavelength bands of each of the light beams incident thereon are different. Below, although the polarization conversion element 6R corresponding to the red light source 1R will be described as an example, the same also applies to the configurations of the other polarization conversion elements 6G and 6B.

Figure 11:
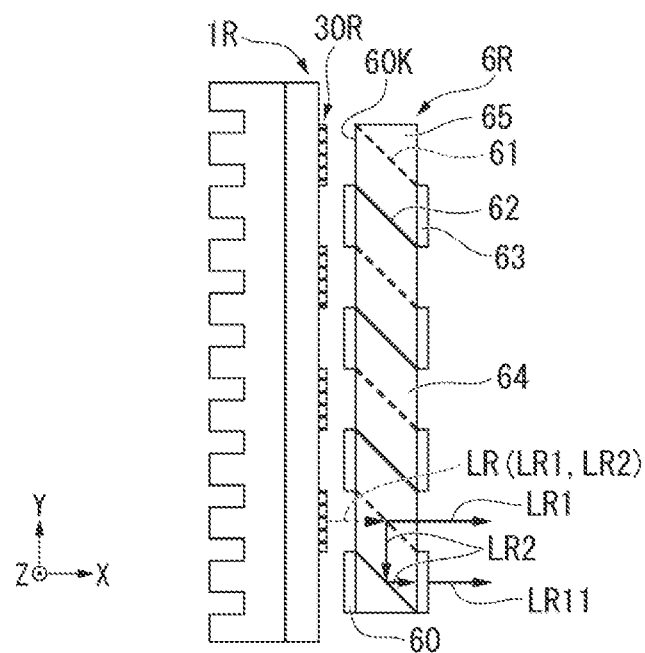
FIG. 11 is a cross-sectional view illustrating a configuration of a polarization conversion element.

FIG. 11 is a cross-sectional view illustrating a configuration of the polarization conversion element 6R. In FIG. 11, the red light source 1R that emits the red light beam LR toward the polarization conversion element 6R is also illustrated.

As illustrated in FIG. 11, the polarization conversion element 6R converts the red light beam LR emitted from the red light source 1R into a linearly polarized light. The polarization conversion element 6R includes a plurality of incident openings 60K that allow the red light beam LR to enter. The plurality of incident openings 60K are disposed spaced apart from each other along the Y-axis direction. Each of the incident openings 60K is constituted by an opening formed in a light shielding film 60 disposed on the light incident surface side of the polarization conversion element 6R.

In the case of this embodiment, in the red light source 1R, in the Y-axis direction, each of the light-emitting elements 30R is arranged at a position corresponding to the incident opening 60K. Note that, in the Z-axis direction, similarly to the first embodiment, the light-emitting elements 30R are arranged at a predetermined pitch.

The polarization conversion element 6R includes a plurality of polarization separation layers 61, a plurality of reflection layers 62, and a plurality of retardation layers 63. The polarization conversion element 6R is constituted by combining a first prism member 64 having a cross-sectional shape of a parallelogram with a second prism member 65 having a cross-sectional shape of a quadrangle, and the polarization separation layers 61 and the reflection layers 62 are provided on surfaces corresponding to a pair of opposing sides of the first prism member 64. The retardation layers 63 are provided on the light emission side of the polarization conversion element 6R.

Here, the red light beam LR includes a first polarization component LR1 that is transmitted through the incident side polarizing plate 41 of the optical modulation device 4, and a second polarization component LR2 different from the first polarization component LR1. The polarization separation layer 61 has polarization separation characteristics in which the first polarization component LR1 included in the red light beam LR is transmitted and the second polarization component LR2 included in the red light beam LR is reflected. Note that the polarization direction of the first polarization component LR1 and the polarization direction of the second polarization component LR2 are different from each other by 90 degrees.

Of the red light beam LR entering from the incident opening 60K of the polarization conversion element 6R, the first polarization component LR1 is transmitted through the polarization separation layer 61 as it is, and the second polarization component LR2 is reflected in the Y-axis direction by the polarization separation layer 61 and reflected in the X-axis direction by the reflection layer 62. The second polarization component LR2 reflected by the reflection layer 62 is incident on the retardation layer 63. The retardation layer 63 is constituted by a ½ wavelength plate. As a result of the second polarization component LR2 being transmitted through the retardation layer 63, the polarization direction of the second polarization component LR2 is rotated by 90 degrees, and the second polarization component LR2 is converted into a first polarization component LR11. The polarization direction of the first polarization component LR1 and the polarization direction of the first polarization component LR11 are the same. The red light beam LR is converted into the first polarization component LR1 and the first polarization component LR11 by the polarization conversion element 6R. As a result, the red light beam LR is converted into a linearly polarized light in which polarization directions are aligned.

The polarization conversion element 6R is disposed with respect to the red light source 1R such that the movement direction (Z-axis direction) of the light-emitting position on the light-emitting region 11R of the red light source 1R is orthogonal to the polarization separation direction (Y-axis direction) in the red light beam LR.

In this way, according to this embodiment, the red light beam LR is converted into the linearly polarized light by the polarization conversion element 6R and caused to enter the optical modulation device 4.

Here, in this embodiment, the first polarization component LR1 and the first polarization component LR11 are different in terms of the length of the optical path in the polarization conversion element 6R, and functional layers (the polarization separation layer 61, the reflection layer 62, and the retardation layer 63) disposed at the optical path. Thus, a difference in the light intensity may occur between the first polarization component LR1 and the first polarization component LR11, and this may cause a degradation in the image quality of a display image. In contrast, for example, the light intensities of the first polarization component LR1 and the first polarization component LR11 may be aligned with each other by adjusting the optical characteristics of the polarization separation layer 61, the reflection layer 62, and the retardation layer 63, and thereby reducing the polarization component passing through one of the optical paths.

For example, in a case in which the positional relationship between the first polarization component LR1 and the first polarization component LR11 on the image forming region 14 of the optical modulation device 4 does not change, the difference in the light intensity between the first polarization component LR1 and the first polarization component LR11 becomes constant. In this case, in consideration of the difference in the light intensity between the first polarization component LR1 and the first polarization component LR11, by the control unit 7 correcting the image information input to the optical modulation device 4 in advance, the degradation in the image quality of the display image may be suppressed.

Generally, when the optical modulation device 4 including the liquid crystal panel 40 is used, it is necessary to cause illumination light having a high degree of polarization to be incident on the optical modulation device 4 as each of the light beams LR, LG, and LB. In contrast, in this embodiment, since the polarization conversion elements 6R, 6G, and 6B are provided corresponding to each of the light sources 1R, 1G, and 1B, there is no need for emitting the light having the high degree of polarization from each of the light-emitting elements 30R, 30G, and 30B of the light sources 1R, 1G, and 1B. Thus, the manufacture of each of the light-emitting elements 30R, 30G, and 30B becomes easy.

Further, in the case of this embodiment, in each of the light sources 1R, 1G, and 1B, the light-emitting elements are disposed so as to be spaced apart from each other at the positions corresponding to the incident openings of the polarization conversion element in the Y-axis direction. Thus, the light emission intensity can be increased by improving the heat dissipation performance.

Third Embodiment

Next, a projector according to a third embodiment will be described. A difference between this embodiment and the first embodiment is that only one light source is used in this embodiment. Below, the same member or configuration as that of the first embodiment will be given the same reference sign, and detailed description thereof will be omitted.

Figure 12:
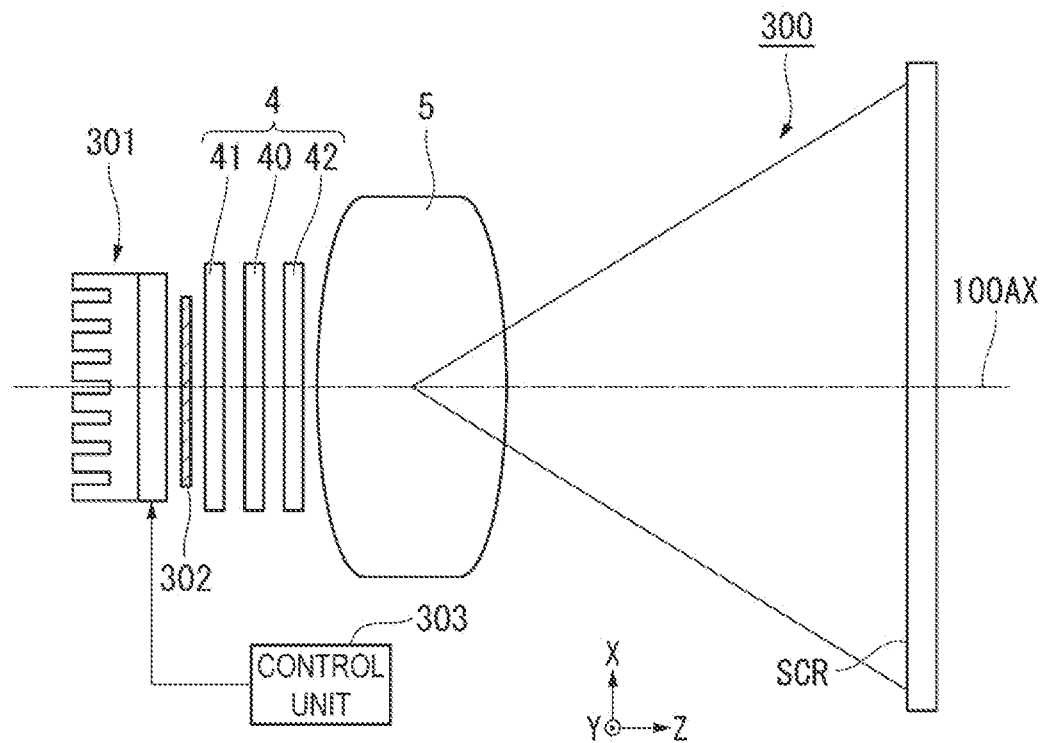
FIG. 12 is a plan view illustrating a schematic configuration of a projector according to a third embodiment.

FIG. 12 is a plan view illustrating a schematic configuration of a projector 300 according to this embodiment.

As illustrated in FIG. 12, the projector 300 of this embodiment includes a light source 301, the optical modulation device 4, the projection optical device 5, a diffusion element 302, and a control unit 303. The optical axis of the light source 301 extends along the illumination optical axis 100AX. For example, as the diffusion element 302, a surface diffusion plate formed by a transparent flat plate having an uneven surface structure, a refractive index distribution type diffusion plate having a refractive index distribution inside a transparent flat plate, a diffraction element, a hologram element, a meta-lens element, or the like can be used.

Figure 13:
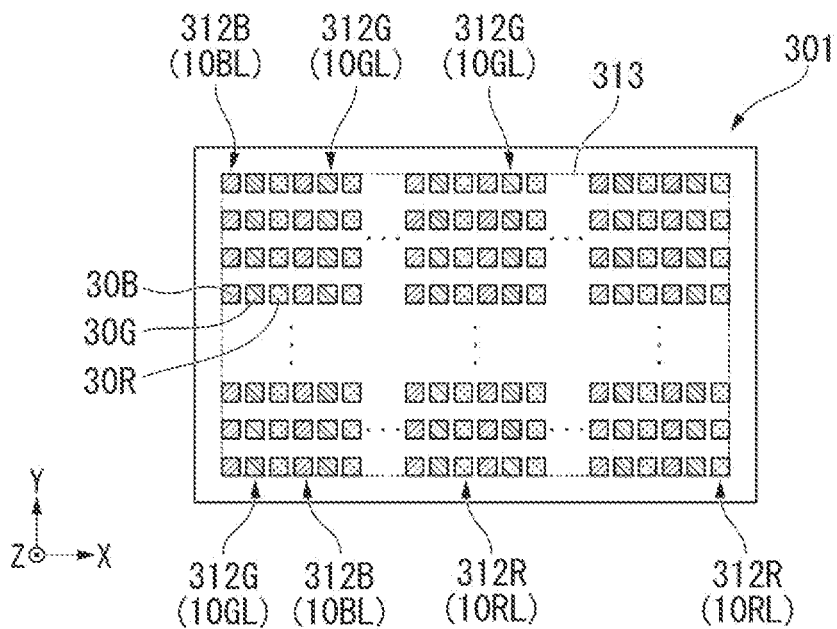
FIG. 13 is a plan view schematically illustrating a configuration of a light source.

FIG. 13 is a plan view schematically illustrating a configuration of the light source 301.

As illustrated in FIG. 13, the light source 301 of this embodiment includes a light-emitting region 313 including a first light-emitting region 312R including a plurality of light-emitting elements 30R, a second light-emitting region 312G including a plurality of light-emitting elements 30G, and a third light-emitting region 312B including a plurality of light-emitting elements 30B. In the light source 301 of this embodiment, each of the light-emitting elements 30R, 30G, and 30B is disposed in an array in the light-emitting region 313. Note that the planar shape of each of the light-emitting elements 30R, 30G, and 30B is a square shape. The control unit 303 controls the light emission of the plurality of light-emitting elements 30R, the light emission of the plurality of light-emitting elements 30G, and the light emission of the plurality of light-emitting elements 30B, respectively.

The first light-emitting region 312R includes a plurality of light-emitting element rows 10RL aligned in the X-axis direction. Each of the light-emitting element rows 10RL is constituted by the light-emitting elements 30R being arranged in a single row at a predetermined pitch in the Y-axis direction. Note that the respective light-emitting elements 30R constituting one of the light-emitting element rows 10RL emit light simultaneously.

The second light-emitting region 312G includes a plurality of light-emitting element rows 10GL aligned in the X-axis direction. Each of the light-emitting element rows 10GL is constituted by the light-emitting elements 30G being arranged in a single row at the predetermined pitch in the Y-axis direction. Note that the respective light-emitting elements 30G constituting one of the light-emitting element rows 10GL emit light simultaneously.

The third light-emitting region 312B includes a plurality of light-emitting element rows 10BL aligned in the X-axis direction. Each of the light-emitting element rows 10BL is constituted by the light-emitting elements 30B being arranged in a single row at the predetermined pitch in the Y-axis direction. Note that the respective light-emitting elements 30B constituting one of the light-emitting element rows 10BL emit light simultaneously.

The respective light-emitting element rows 10RL, 10GL, and 10BL are disposed alternately in the X-axis direction. Note that the arrangement pitch in the X-axis direction between each of the light-emitting elements 30R, 30G, and 30B is the same. Below, when the first light-emitting region 312R, the second light-emitting region 312G, and the third light-emitting region 312B are collectively referred to without distinction, they will be referred to as each of the light-emitting regions 312R, 312G, and 312B.

The control unit 303 of this embodiment causes each of the light-emitting regions 312R, 312G, and 312B to emit light so as to form three light-emitting groups rather than causing each of the light-emitting element rows 10RL, 10GL, and 10BL aligned in the X-axis direction to emit the light sequentially.

A light emission operation of the light source 301 will be specifically described below.

Figure 14:
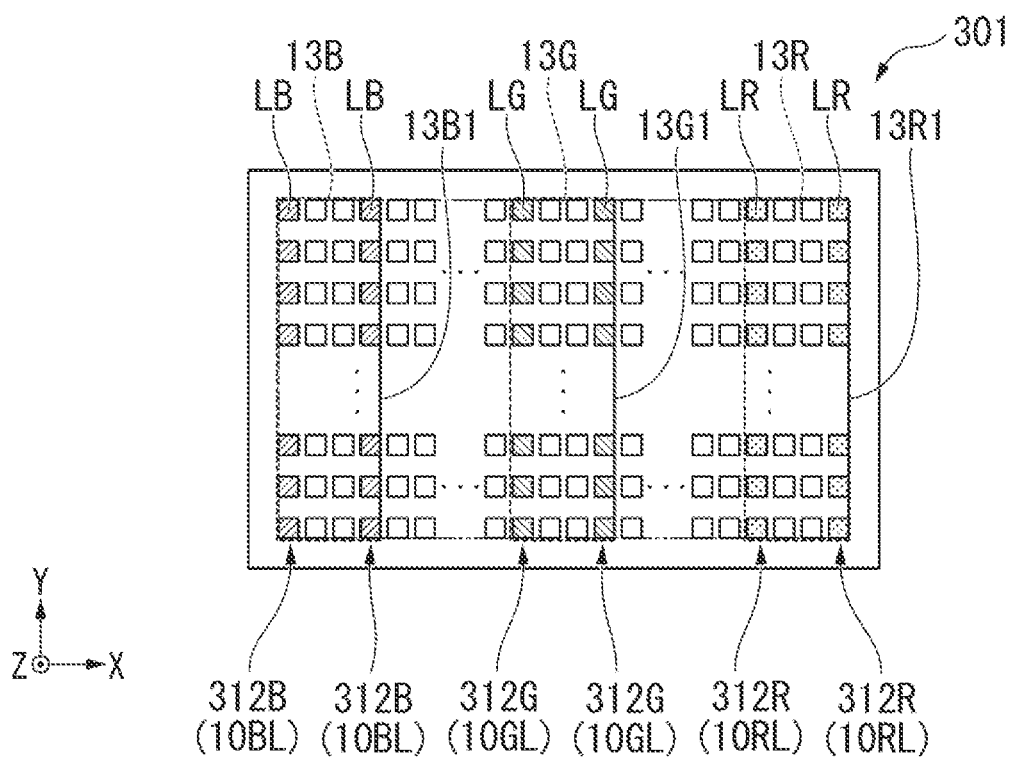
FIG. 14 is a diagram conceptually illustrating a light emission operation of the light source.

FIG. 14 is a diagram conceptually illustrating the light emission operation of the light source 301. In FIG. 14, hatching is applied to only the light-emitting elements that are emitting light among each of the light-emitting elements 30R, 30G, and 30B.

As illustrated in FIG. 14, in each of the light-emitting regions 312R, 312G, and 312B of the light source 301, the control unit 303 causes a red light-emitting group 13R, a green light-emitting group 13G, and a blue light-emitting group 13B to emit light simultaneously in an intermittent manner at predetermined timings, and causes light-emitting positions to move sequentially in the X-axis direction. The red light-emitting group 13R includes a plurality of the light-emitting element rows 10RL aligned in the X-axis direction. The green light-emitting group 13G includes a plurality of the light-emitting element rows 10GL aligned in the X-axis direction. The blue light-emitting group 13B includes a plurality of the light-emitting element rows 10BL aligned in the X-axis direction. Note that in FIG. 14, a case is illustrated in which each of the light-emitting groups 13R, 13G, and 13B is constituted by two each of the light-emitting element rows 10RL, 10GL, and 10BL, respectively, but the number of the light-emitting elements rows constituting each of the light-emitting groups is not limited to this example.

In this manner, the control unit 303 causes the red light beam LR to be emitted from the red light-emitting group 13R of the first light-emitting region 312R, causes the green light beam LG to be emitted from the green light-emitting group 13G of the second light-emitting region 312G, and causes the blue light beam LB to be emitted from the blue light-emitting group 13B of the third light-emitting region 312B.

In this embodiment, the light-emitting element rows 10RL, 10GL, and 10BL are spaced apart from each other in the X-axis direction in each of the light-emitting groups 13R, 13G, and 13B. Thus, there is a risk that each of the light beams LR, LG, and LB may become a light beam separated in the X-axis direction. However, in this embodiment, each of the light beams LR, LG, and LB is diffused by the diffusion element 302. Thus, by causing the adjacent light beams in the X-axis direction to partially overlap with each other, each of the light beams LR, LG, and LB can illuminate the image forming region 14 of the optical modulation device 4 with a uniform intensity distribution.

In a similar manner as illustrated by the states of the first embodiment in FIG. 4, each of the light-emitting groups 13R, 13G, and 13B moves sequentially to the right side (positive X side) at predetermined timings, then when reaching the right end (the end portion on the positive X side), moves instantaneously to the left end (the end portion on the negative X side), and again, moves sequentially to the right side (positive X side). In other words, at a certain timing, each of the light beams LR, LG, and LB emitted from each of the light-emitting groups 13R, 13G, and 13B is brought into a state in which each of the light beams LR, LG, and LB is constituted by two light beams emitted from positions that are largely separated in the X-axis direction. However, the sum of the dimensions in the X-axis direction of the two light beams is equal to the dimension of the light beam obtained before the separation.

In this way, the control unit 303 controls the light emission intensity by turning on or off each of the light-emitting elements 30R, 30G, and 30B in the light source 301. Further, by changing the light-emitting position of each of the light beams LR, LG, and LB in each of the light-emitting regions 312R, 312G, and 312B, the control unit 301 moves the illumination region of each of the light beams LR, LG, and LB on the image forming region 14 of the optical modulation device 4, in a similar manner as illustrated by the states of the first embodiment in FIG. 5. Thus, each of the light beams LR, LG, and LB emitted from the light source 301 illuminates the image forming region 14 of the optical modulation device 4 while being caused to scan cyclically over the image forming region 14 in one direction from the negative X side toward the positive X side. In other words, even in the case of this embodiment, the illumination regions of each of the light beams LR, LG, and LB do not overlap with each other on the image forming region 14. In this embodiment, the illumination regions of each of the light beams LR, LG, and LB do not overlap with each other on the image forming region 14. However, the embodiment is not limited to this example, the illumination regions SR, SG, and SB may overlap with each other on the image forming region 14 as long as the overlap is not visually recognizable.

The optical modulation device 4 of this embodiment writes the red light image information, the green light image information, and the blue light image information corresponding to each of the light beams LR, LG, and LB to each of the scanning lines 14R, 14G, and 14B, in a similar manner as illustrated by the states of the first embodiment in FIG. 5. Note that in this embodiment, leading positions 13R1, 13G1, and 13B1, on the positive X side, of each of the light-emitting groups 13R, 13G, and 13B illustrated in FIG. 14 correspond to each of the scanning lines 14R, 14G, and 14B in the image forming region 14 of the optical modulation device 4.

As described above, according to the projector 300 of this embodiment, by cyclically moving the illumination regions SR, SG, and SB of the light beams LR, LG, and LB emitted from the light source 301 in one direction on the image forming region 14 of the optical modulation device 4, a color image can be displayed using the single optical modulation device 4 while suppressing an increase in size of the device configuration.

First Modified Example of Third Embodiment

Next, a first modified example of the projector according to the third embodiment will be described. A difference between this modified example and the third embodiment is the planar shape of each of the light-emitting elements 30R, 30G, and 30B in the light source 301, and the other configurations are the same. Thus, below, the same member or configuration as that of the third embodiment will be given the same reference sign, and detailed description thereof will be omitted.

In the third embodiment, a case is described as an example in which the planar shape of each of the light-emitting elements 30R, 30G, and 30B in the light source 301 is a square shape, but the planar shape of each of the light-emitting elements 30R, 30G, and 30B is not limited to this example.

Figure 15:
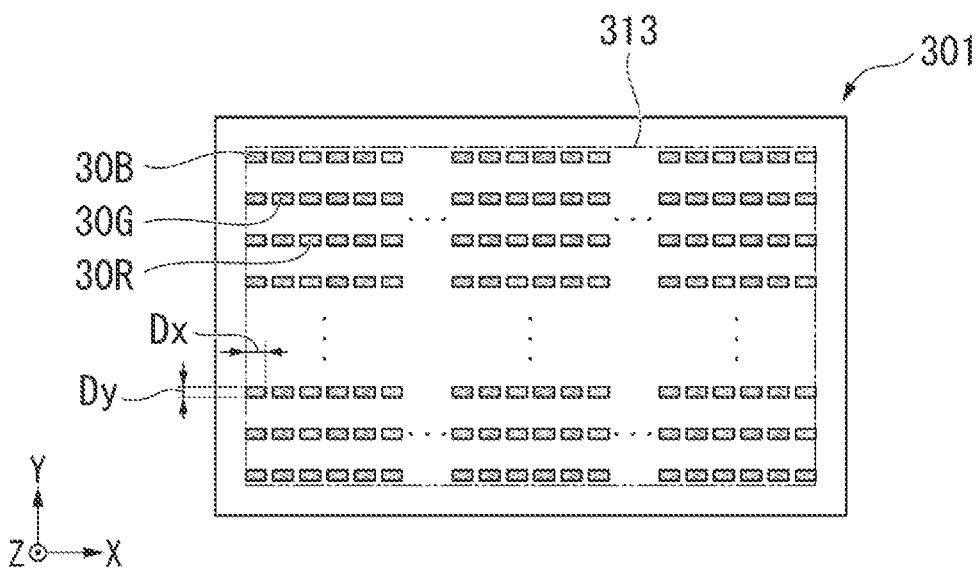
FIG. 15 is a plan view illustrating a configuration of a first modified example of the third embodiment.

FIG. 15 is a plan view schematically illustrating a configuration of the light source of this modified example.

As illustrated in FIG. 15, in this modified example, the planar shape of each of the light-emitting elements 30R, 30G, and 30B is a rectangular shape. In other words, the length Dy in the Y-axis direction of each of the light-emitting elements 30R, 30G, and 30B is smaller than the length Dx thereof in the X-axis direction. In this way, the planar shape of each of the light-emitting elements 30R, 30G, and 30B is a rectangular shape with the shorter sides extending in the Y-axis direction. Since each of the light-emitting elements 30R, 30G, and 30B has a shorter resonance length in the Y-axis direction, the light distribution angle thereof becomes larger in the Y-axis direction. Thus, adjacent light beams emitted from the light-emitting element rows of the light-emitting groups of the same color are more likely to overlap with each other in the Y-axis direction, and thus, the uniformity of the intensity distribution in the Y-axis direction of each of the light beams LR, LG, and LB emitted from each of the light-emitting groups 13R, 13G, and 13B can be increased.

Further, according to this modified example, since the distance in the Y-axis direction in which the light-emitting elements 30R, 30G, and 30B are aligned is relatively expanded, the heat dissipation performance of each of the light-emitting element 30R, 30G, and 30B is improved, and the light emission intensity of each of the light-emitting elements 30R, 30G, and 30B can be increased.

Second Modified Example of Third Embodiment

Next, a second modified example of the projector according to the third embodiment will be described. A difference between this modified example and the first modified example is the planar shape of each of the light-emitting elements 30R, 30G, and 30B in the light source 301. Thus, below, the same member or configuration as that of the third embodiment and the first modified example will be given the same reference sign, and detailed description thereof will be omitted.

Figure 16:
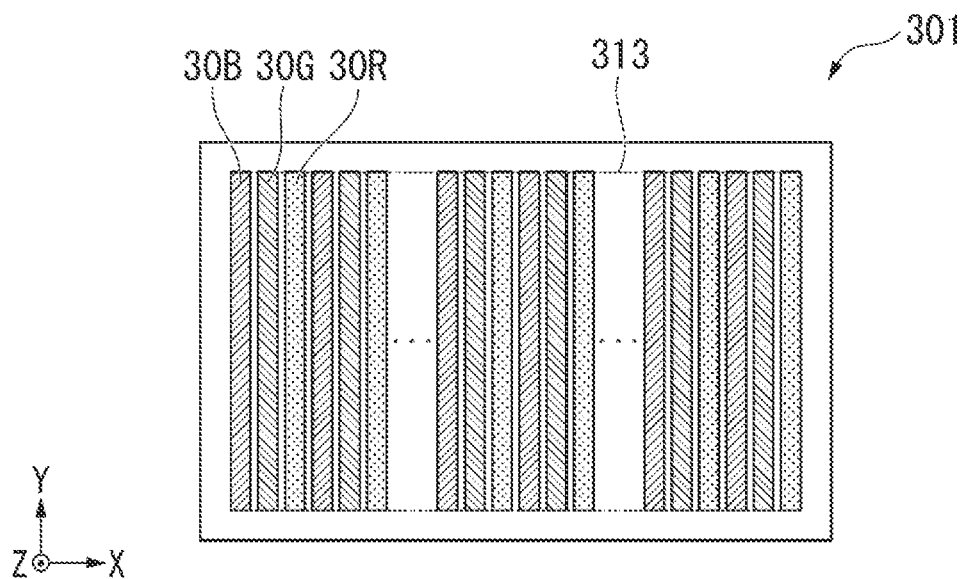
FIG. 16 is a plan view illustrating a configuration of a second modified example of the third embodiment.

FIG. 16 is a plan view schematically illustrating a configuration of the light source of this modified example.

As illustrated in FIG. 16, in this modified example, the planar shape of each of the light-emitting elements 30R, 30G, and 30B is an elongated rectangular shape. In other words, when the light-emitting region 313 including the light-emitting regions 312R, 312G, and 312B is viewed in plan view, each of the light-emitting elements 30R has a strip shape that is elongated in the Y-axis direction in which the red light beam LR extends, and is arranged along the X-axis direction orthogonal to the Y-axis direction, each of the light-emitting elements 30G has a strip shape that is elongated in the Y-axis direction in which the green light beam LG extends, and is arranged along the X-axis direction orthogonal to the Y-axis direction, and each of the light-emitting elements 30B has a strip shape that is elongated in the Y-axis direction in which the blue light beam LB extends, and is arranged along the X-axis direction orthogonal to the Y-axis direction. Each of the light-emitting elements 30R, 30G, and 30B are disposed alternately in the X-axis direction.

According to the light source 301 of this modified example, since each of the light-emitting elements 30R, 30G, and 30B has the rectangular shape that is elongated in the Y-axis direction, the number of the light-emitting elements formed on each of the light-emitting regions 312R, 312G, and 312B can be reduced compared to the configuration of the first embodiment or the first modified example. Thus, by reducing the number of the light-emitting elements, a driving circuit, a control circuit, and the like in the light source 301 can be simplified, and a cost reduction can be achieved.

Third Modified Example of Third Embodiment

Next, a third modified example of the projector according to the third embodiment will be described. A difference between this modified example and the first modified example is the planar shape of each of the light-emitting elements 30R, 30G, and 30B in the light source 301. Thus, below, the same member or configuration as that of the third embodiment and the first modified example will be given the same reference sign, and detailed description thereof will be omitted.

Figure 17:
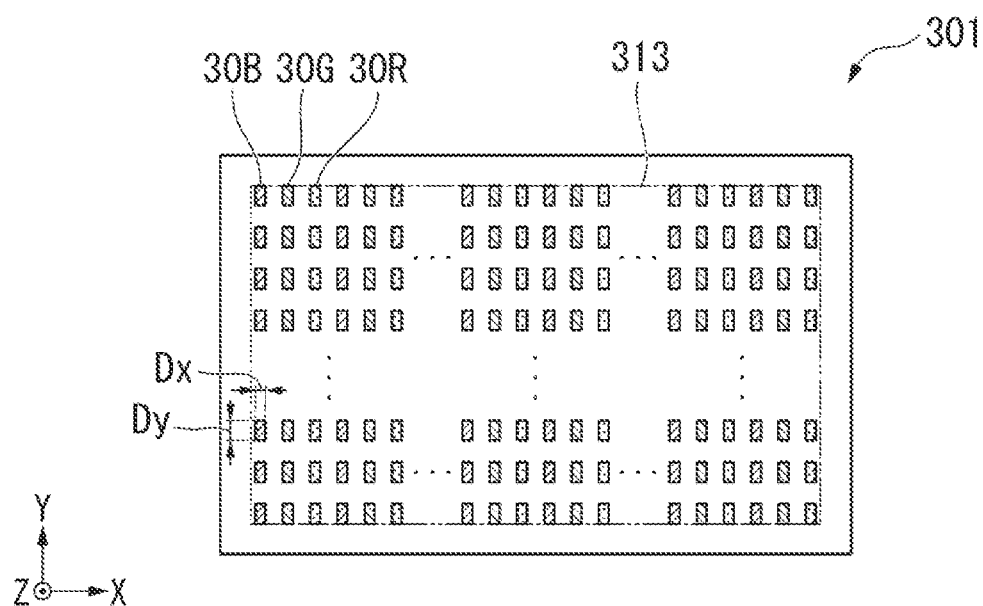
FIG. 17 is a plan view illustrating a configuration of a third modified example of the third embodiment.

FIG. 17 is a plan view schematically illustrating a configuration of the light source of this modified example.

As illustrated in FIG. 17, in this modified example, the length Dy in the Y-axis direction of each of the light-emitting elements 30R, 30G, and 30B is greater than the length Dx thereof in the X-axis direction. In this modified example, the planar shape of each of the light-emitting elements 30R, 30G, and 30B is a rectangular shape with the longer sides extending in the Y-axis direction. Since each of the light-emitting elements 30R, 30G, and 30B has a shorter resonance length in the X-axis direction, the light distribution angle thereof becomes larger in the X-axis direction. Thus, the adjacent light beams emitted from the light-emitting element rows of the light-emitting groups of the same color are more likely to overlap with each other in the X-axis direction, and thus, the uniformity of the intensity distribution in the X-axis direction of each of the light beams LR, LG, and LB emitted from each of the light-emitting groups 13R, 13G, and 13B can be increased.

Note that, in the projector 300 of the third embodiment, a polarization conversion element may be disposed between the light source 301 and the diffusion element 302. In other words, the configuration of the second embodiment may be applied to the third embodiment. According to this configuration, it is not necessary to emit light having a high degree of polarization from each of the light-emitting elements 30R, 30G, and 30B of the light source 301. Thus, the manufacture of the light source 301 becomes easy. Further, since each of the light-emitting elements 30R, 30G, and 30B of the light source 301 is discretely disposed at the position corresponding to the incident opening of the polarization conversion element, the light emission intensity of each of the light-emitting elements 30R, 30G, and 30B can be increased by improving the heat dissipation performance of the light source 301.

Further, in the projector 300 of the third embodiment, degrees of diffusion of the diffusion element 302 may be varied in the Y-axis direction. In other words, the configuration of the third modified example of the first embodiment may be applied to the third embodiment. For example, in the diffusion element 302, the diffusion angle may be caused to be relatively large in a central portion in the Y-axis direction of the diffusion element 302 and to become relatively smaller toward end portions of the diffusion element 302. According to this configuration, by suppressing the deformation at the end portions of each of the light beams LR, LG, and LB, it is possible to efficiently illuminate the image forming region 14 of the optical modulation device 4.

Note that the technical scope of the present disclosure is not limited to the above-described embodiments and modified examples, and various modifications can be made to the above-described embodiments and modified examples without departing from the spirit and gist of the present disclosure.

For example, in the embodiments described above, a case is described as an example in which the illumination regions SR, SG, and SB of each of the light beams LR, LG, and LB are aligned without any gap therebetween on the image forming region 14, but light-free regions in which a light beam is not present may be formed between the illumination regions SR, SG, and SB. When such a light-free region is provided, a type of intermittent display is achieved, and blurring of a moving image is suppressed. Thus, the image quality of the moving image can be improved.

Further, in the first embodiment, a case is described as an example in which the three light sources 1R, 1G, and 1B are used, but two light sources may be used instead. When the two light sources are used, a color image may be displayed by illuminating the image forming region 14 of the optical modulation device 4 with a light beam having one wavelength (red, for example) emitted from one of the light sources, and light beams having two wavelengths (green and blue, for example) emitted from the other of the light sources. Alternatively, by emitting light beams having two or more wavelengths from each of the two light sources, a color image may be displayed using four or more types of the light beams.

Further, in the third embodiment, a configuration is described as an example in which the light source 301 is configured to emit the light beams having the three mutually different wavelengths, but a light source that emits light beams having four or more mutually different wavelengths may be used instead. For example, a light source configured to emit four types of light including yellow light in addition to the red, green, and blue light, or a light source configured to emit a combination of visible light, such as red, green, and blue light, and infrared light may be used. Further, in the light source 301 of the third embodiment, a configuration may be employed in which light beams having two mutually different wavelengths are emitted.

Furthermore, the specific configuration such as the number, arrangement, shape, and material of the various components that constitute the projector is not limited to the above-mentioned embodiments, and may be changed as appropriate.

A projector according to an aspect of the present disclosure may have the following configuration.

A projector according to an aspect of the present disclosure includes a first light source including a first light-emitting region including a plurality of first light-emitting elements, the first light source being configured to emit a first light beam from the first light-emitting region, a second light source including a second light-emitting region including a plurality of second light-emitting elements emitting light having a wavelength different from a wavelength of the first light-emitting element, the second light source being configured to emit a second light beam from the second light-emitting region, an optical system configured to align traveling directions of the first light beam and the second light beam, an optical modulation device configured to modulate the first light beam and the second light beam incident from the optical system in accordance with image information, a projection optical device configured to project an image formed by the optical modulation device, and a control unit configured to control a light emission intensity of each of the plurality of first light-emitting elements of the first light source and a light emission intensity of each of the plurality of second light-emitting elements of the second light source. The control unit changes a light-emitting position of the first light beam in the first light-emitting region to move a first illumination region of the first light beam on an image forming region of the optical modulation device, and changes a light-emitting position of the second light beam in the second light-emitting region to move a second illumination region of the second light beam, in the same direction as the first illumination region, on the image forming region of the optical modulation device.

In the projector according to the aspect of the present disclosure, the first illumination region and the second illumination region may be configured not to overlap with each other on the image forming region.

A projector according to another aspect of the present disclosure includes a light source including a first light-emitting region including a plurality of first light-emitting elements and configured to emit a first light beam, and a second light-emitting region including a plurality of second light-emitting elements and configured to emit a second light beam having a wavelength different from a wavelength of the first light beam, an optical modulation device configured to modulate the first light beam and the second light beam incident from the light source in accordance with image information, a projection optical device configured to project an image formed by the optical modulation device, and a control unit configured to control a light emission intensity of each of the plurality of first light-emitting elements and a light emission intensity of each of the plurality of second light-emitting elements. The control unit changes a light-emitting position of the first light beam in the first light-emitting region to move a first illumination region of the first light beam on an image forming region of the optical modulation device, and changes a light-emitting position of the second light beam in the second light-emitting region to move a second illumination region of the second light beam, in the same direction as the first illumination region, on the image forming region of the optical modulation device.

In the projector according to the other aspect of the present disclosure, the first illumination region and the second illumination region may be configured not to overlap with each other on the image forming region.

The projector according to the aspect of the present disclosure may further include a first diffusion element disposed on a light emission side of the first light source and on which the first light beam is incident, and a second diffusion element disposed on a light emission side of the second light source and on which the second light beam is incident.

In the projector according to the aspect of the present disclosure, the first diffusion element may have a different degree of diffusion depending on a position in a length direction in which the first light beam extends, and the second diffusion element may have a different degree of diffusion depending on a position in a length direction in which the second light beam extends.

The projector according to the aspect of the present disclosure may further include further a first polarization conversion element disposed on a light emission side of the first light source and configured to convert a polarization direction of the first light beam into a polarization direction corresponding to the optical modulation device, and a second polarization conversion element disposed on a light emission side of the second light source and configured to convert a polarization direction of the second light beam into a polarization direction corresponding to the optical modulation device.

The projector according to the aspect of the present disclosure may further include a third light source including a third light-emitting region including a plurality of third light-emitting elements emitting light having a wavelength different from the wavelengths of the first light-emitting element and the second light-emitting element, the third light source being configured to emit a third light beam from the third light-emitting region. The optical system may align a traveling direction of the third light beam with the traveling direction of the first light beam and the second light beam, and the optical modulation device may modulate the first light beam, the second light beam, and the third light beam incident from the optical system based on image information. The control unit may control a light emission intensity of each of the plurality of third light-emitting elements, and changes a light-emitting position of the third light beam in the third light-emitting region to move a third illumination region of the third light beam, in the same direction as the first illumination region and the second illumination region, on the image forming region of the optical modulation device, and the first illumination region, the second illumination region, and the third illumination region may illuminate different positions of the optical modulation device, respectively.

In the projector according to the aspect of the present disclosure, the control unit may change a light-emitting position of the first light beam in the first light-emitting region to cyclically move the first illumination region in one direction on the image forming region, and may change a light-emitting position of the second light beam in the second light-emitting region to cyclically move the second illumination region in one direction on the image forming region.

The projector according to the other aspect of the present disclosure may further include a diffusion element disposed on a light emission side of the light source and on which the first light beam and the second light beam are incident.

In the projector according to the other aspect of the present disclosure, the diffusion element may have a different degree of diffusion depending on a position in a length direction in which the first light beam and the second light beam extend.

In the projector according to the other aspect of the present disclosure, the light source may further include a third light-emitting region including a plurality of third light-emitting elements and configured to emit a third light beam having a wavelength different from the wavelengths of the first light beam and the second light beam. The optical modulation device may modulate the first light beam, the second light beam, and the third light beam incident from the light source, based on image information. The control unit may control a light emission intensity of each of the plurality of third light-emitting elements, and changes a light-emitting position of the third light beam in the third light-emitting region to move a third illumination region of the third light beam, in the same direction as the first illumination region and the second illumination region, on the image forming region of the optical modulation device, and the first illumination region, the second illumination region, and the third illumination region may be configured not to overlap with each other on the image forming region.

In the projector according to the other aspect of the present disclosure, the control unit may change the light-emitting position of the first light beam in the first light-emitting region and the light-emitting position of the second light beam in the second light-emitting region to cyclically move the first illumination region and the second illumination region in one direction on the image forming region.

In the projector according to the aspect of the present disclosure, the plurality of first light-emitting elements may be arranged in an array along both a first direction in which the first light beam extends and a second direction orthogonal to the first direction, and the plurality of second light-emitting elements may be arranged in an array along both a third direction in which the second light beam extends and a fourth direction orthogonal to the third direction.

In the projector according to the aspect of the present disclosure, each of the plurality of first light-emitting elements may have a rectangular shape having shorter sides in the first direction and longer sides in the second direction, and each of the plurality of second light-emitting elements may have a rectangular shape having shorter sides in the third direction and longer sides in the fourth direction.

In the projector according to the aspect of the present disclosure, each of the plurality of first light-emitting elements may have a rectangular shape that is elongated in a first direction in which the first light beam extends and is arranged along a second direction orthogonal to the first direction, and each of the plurality of second light-emitting elements may have a rectangular shape that is elongated in a third direction in which the second light beam extends and be arranged along a fourth direction orthogonal to the third direction.

In the projector according to the other aspect of the present disclosure, each of the plurality of first light-emitting elements may have a rectangular shape having shorter sides in a first direction in which the first beam extends and longer sides in a second direction orthogonal to the first direction, and each of the plurality of second light-emitting elements may have a rectangular shape having shorter sides in the first direction and longer sides in the second direction.

In the projector according to the other aspect of the present disclosure, each of the plurality of first light-emitting elements may have a rectangular shape that is elongated in a first direction in which the first light beam extends and is arranged along a second direction orthogonal to the first direction, and the plurality of second light-emitting elements each may have a rectangular shape that is elongated in the first direction and be arranged at positions different from the plurality of first light-emitting elements along the second direction.

In the projector according to the other aspect of the present disclosure, each of the plurality of first light-emitting elements may have a rectangular shape having longer sides in a first direction in which the first beam extends and shorter sides in a second direction orthogonal to the first direction, and each of the plurality of second light-emitting elements may have a rectangular shape having longer sides in the first direction and shorter sides in the second direction.

In the projector according to the aspect of the present disclosure, each of the plurality of first light-emitting elements and the plurality of second light-emitting elements may include a photonic crystal structure.

In the projector according to the aspect of the present disclosure, the image forming region of the optical modulation device may have a rectangular shape, and a length direction in which each of the first illumination region and the second illumination region extends may be along a shorter-side direction of the image forming region.

What is claimed is:
1. A projector comprising:
a first light source including a first light-emitting region including a plurality of first light-emitting elements, the first light source being configured to emit a first light beam from the first light-emitting region;
a second light source including a second light-emitting region including a plurality of second light-emitting elements emitting light having a wavelength different from a wavelength of the first light-emitting element, the second light source being configured to emit a second light beam from the second light-emitting region;
an optical system configured to align traveling directions of the first light beam and the second light beam;
an optical modulation device configured to modulate the first light beam and the second light beam incident from the optical system in accordance with image information;
a projection optical device configured to project an image formed by the optical modulation device; and
a control unit configured to control a light emission intensity of each of the plurality of first light-emitting elements of the first light source and a light emission intensity of each of the plurality of second light-emitting elements of the second light source, wherein
the control unit changes a light-emitting position of the first light beam in the first light-emitting region to move a first illumination region of the first light beam on an image forming region of the optical modulation device,
changes a light-emitting position of the second light beam in the second light-emitting region to move a second illumination region of the second light beam, in the same direction as the first illumination region, on the image forming region of the optical modulation device, and
the first illumination region and the second illumination region do not overlap with each other on the image forming region.
2. A projector comprising:
a light source including
a first light-emitting region including a plurality of first light-emitting elements and configured to emit a first light beam, and
a second light-emitting region including a plurality of second light-emitting elements and configured to emit a second light beam having a wavelength different from a wavelength of the first light beam;

an optical modulation device configured to modulate the first light beam and the second light beam incident from the light source in accordance with image information;
a projection optical device configured to project an image formed by the optical modulation device; and
a control unit configured to control a light emission intensity of each of the plurality of first light-emitting elements and a light emission intensity of each of the plurality of second light-emitting elements, wherein
the control unit changes a light-emitting position of the first light beam in the first light-emitting region to move a first illumination region of the first light beam on an image forming region of the optical modulation device,
changes a light-emitting position of the second light beam in the second light-emitting region to move a second illumination region of the second light beam, in the same direction as the first illumination region, on the image forming region of the optical modulation device, and
the first illumination region and the second illumination region do not overlap with each other on the image forming region.

3. The projector according to claim 1, further comprising:
a first diffusion element disposed on a light emission side of the first light source and on which the first light beam is incident; and
a second diffusion element disposed on a light emission side of the second light source and on which the second light beam is incident.

4. The projector according to claim 3, wherein
the first diffusion element has a different degree of diffusion depending on a position in a length direction in which the first light beam extends, and
the second diffusion element has a different degree of diffusion depending on a position in a length direction in which the second light beam extends.

5. The projector according to claim 1, further comprising:
a first polarization conversion element disposed on a light emission side of the first light source and configured to convert a polarization direction of the first light beam into a polarization direction corresponding to the optical modulation device, and
a second polarization conversion element disposed on a light emission side of the second light source and configured to convert a polarization direction of the second light beam into a polarization direction corresponding to the optical modulation device.

6. The projector according to claim 1, further comprising:
a third light source including a third light-emitting region including a plurality of third light-emitting elements emitting light having a wavelength different from the wavelengths of the first light-emitting element and the second light-emitting element, the third light source being configured to emit a third light beam from the third light-emitting region, wherein
the optical system aligns a traveling direction of the third light beam with the traveling direction of the first light beam and the second light beam,
the optical modulation device modulates the first light beam, the second light beam, and the third light beam incident from the optical system based on image information,
the control unit controls a light emission intensity of each of the plurality of third light-emitting elements, and
changes a light-emitting position of the third light beam in the third light-emitting region to move a third illumination region of the third light beam, in the same direction as the first illumination region and the second illumination region, on the image forming region of the optical modulation device, and
the first illumination region, the second illumination region, and the third illumination region illuminate different positions of the optical modulation device, respectively.

7. The projector according to claim 1, wherein
the control unit changes a light-emitting position of the first light beam in the first light-emitting region to cyclically move the first illumination region in one direction on the image forming region, and
changes a light-emitting position of the second light beam in the second light-emitting region to cyclically move the second illumination region in one direction on the image forming region.

8. The projector according to claim 2, further comprising
a diffusion element disposed on a light emission side of the light source and on which the first light beam and the second light beam are incident.

9. The projector according to claim 8, wherein
the diffusion element has a different degree of diffusion depending on a position in a length direction in which the first light beam and the second light beam extend.

10. The projector according to claim 2, wherein
the light source further includes a third light-emitting region including a plurality of third light-emitting elements and configured to emit a third light beam having a wavelength different from the wavelengths of the first light beam and the second light beam,
the optical modulation device modulates the first light beam, the second light beam, and the third light beam incident from the light source, based on image information,
the control unit controls a light emission intensity of each of the plurality of third light-emitting elements, and changes a light-emitting position of the third light beam in the third light-emitting region to move a third illumination region of the third light beam, in the same direction as the first illumination region and the second illumination region, on the image forming region of the optical modulation device, and
the first illumination region, the second illumination region, and the third illumination region do not overlap with each other on the image forming region.

11. The projector according to claim 2, wherein
the control unit changes the light-emitting position of the first light beam in the first light-emitting region and the light-emitting position of the second light beam in the second light-emitting region to cyclically move the first illumination region and the second illumination region in one direction on the image forming region.

12. The projector according to claim 1, wherein
the plurality of first light-emitting elements are arranged in an array along both a first direction in which the first light beam extends and a second direction orthogonal to the first direction, and
the plurality of second light-emitting elements are arranged in an array along both a third direction in which the second light beam extends and a fourth direction orthogonal to the third direction.

13. The projector according to claim 12, wherein
each of the plurality of first light-emitting elements has a rectangular shape having shorter sides in the first direction and longer sides in the second direction, and each of the plurality of second light-emitting elements has a rectangular shape having shorter sides in the third direction and longer sides in the fourth direction.

14. The projector according to claim 1, wherein
each of the plurality of first light-emitting elements has a rectangular shape that is elongated in a first direction in which the first light beam extends and is arranged along a second direction orthogonal to the first direction, and
the plurality of second light-emitting elements has a rectangular shape that is elongated in a third direction in which the second light beam extends and is arranged along a fourth direction orthogonal to the third direction.

15. The projector according to claim 2, wherein
each of the plurality of first light-emitting elements has a rectangular shape having shorter sides in a first direction in which the first beam extends and longer sides in a second direction orthogonal to the first direction, and
the plurality of second light-emitting elements has a rectangular shape having shorter sides in the first direction and longer sides in the second direction.

16. The projector according to claim 2, wherein
each of the plurality of first light-emitting elements has a rectangular shape that is elongated in a first direction in which the first light beam extends and is arranged along a second direction orthogonal to the first direction, and
the plurality of second light-emitting elements have a rectangular shape that is elongated in the first direction and are arranged at positions different from the plurality of first light-emitting elements along the second direction.

17. The projector according to claim 2, wherein
each of the plurality of first light-emitting elements has a rectangular shape having longer sides in a first direction in which the first beam extends and shorter sides in a second direction orthogonal to the first direction, and
the plurality of second light-emitting elements have a rectangular shape having longer sides in the first direction and shorter sides in the second direction.

18. The projector according to claim 1, wherein
the image forming region of the optical modulation device has a rectangular shape, and
a length direction in which each of the first illumination region and the second illumination region extends is along a shorter-side direction of the image forming region.

19. A projector comprising:
a light source including
   a first light-emitting region including a plurality of first light-emitting elements and configured to emit a first light beam, and
   a second light-emitting region including a plurality of second light-emitting elements and configured to emit a second light beam having a wavelength different from a wavelength of the first light beam;
an optical modulation device configured to modulate the first light beam and the second light beam incident from the light source in accordance with image information;
a projection optical device configured to project an image formed by the optical modulation device; and
a control unit configured to control a light emission intensity of each of the plurality of first light-emitting elements and a light emission intensity of each of the plurality of second light-emitting elements, wherein
the control unit
   changes a light-emitting position of the first light beam in the first light-emitting region to move a first illumination region of the first light beam on an image forming region of the optical modulation device, and
   changes a light-emitting position of the second light beam in the second light-emitting region to move a second illumination region of the second light beam, in the same direction as the first illumination region, on the image forming region of the optical modulation device,
the light source further includes a third light-emitting region including a plurality of third light-emitting elements and configured to emit a third light beam having a wavelength different from the wavelengths of the first light beam and the second light beam,
the optical modulation device modulates the first light beam, the second light beam, and the third light beam incident from the light source, based on image information,
the control unit controls a light emission intensity of each of the plurality of third light-emitting elements, and changes a light-emitting position of the third light beam in the third light-emitting region to move a third illumination region of the third light beam, in the same direction as the first illumination region and the second illumination region, on the image forming region of the optical modulation device, and
the first illumination region, the second illumination region, and the third illumination region do not overlap with each other on the image forming region.

* * * * *